May 3, 1960
G. PLUNKETT
2,935,254
CALCULATING MACHINE
Filed Jan. 4, 1954
16 Sheets-Sheet 8
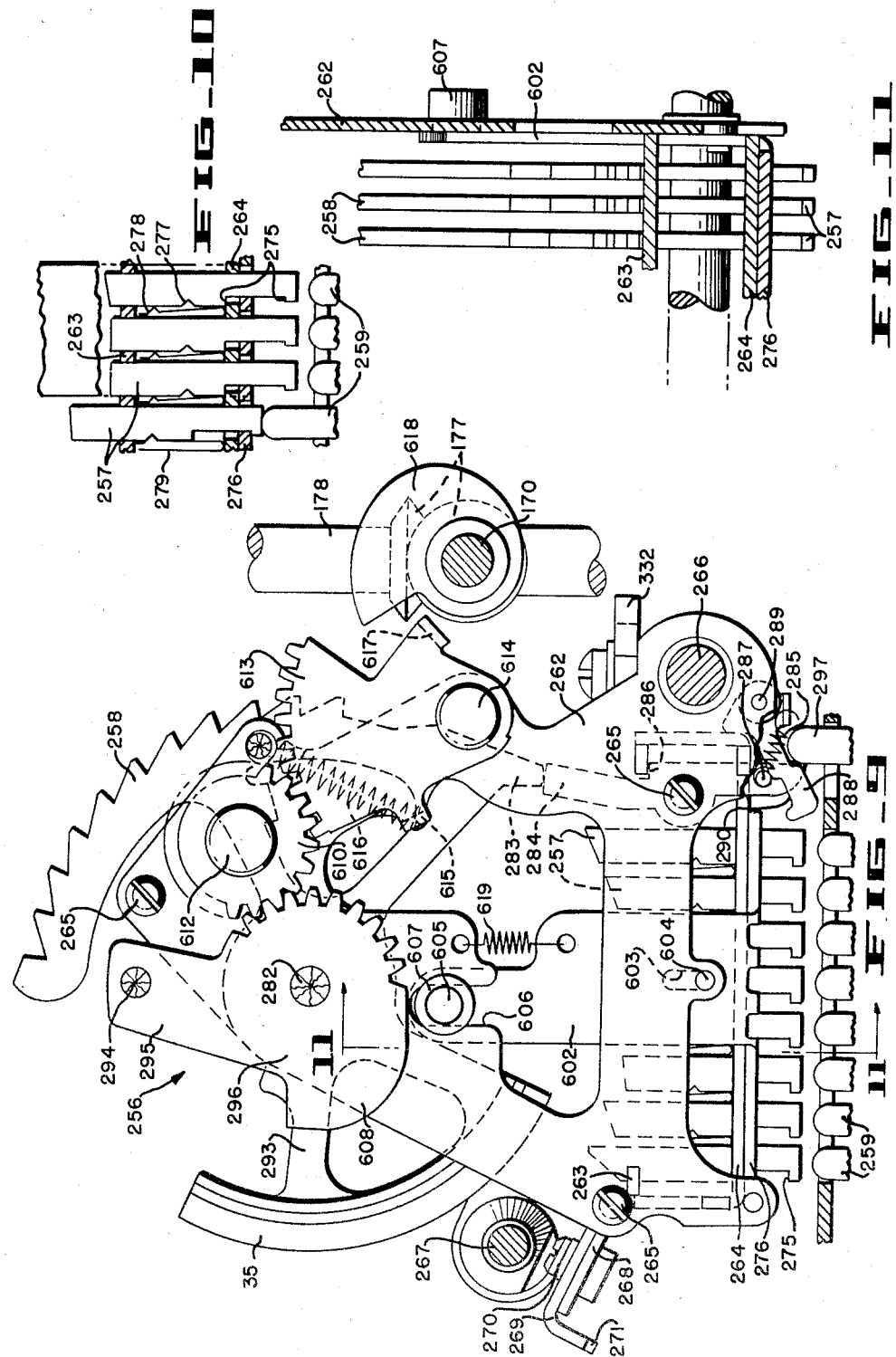

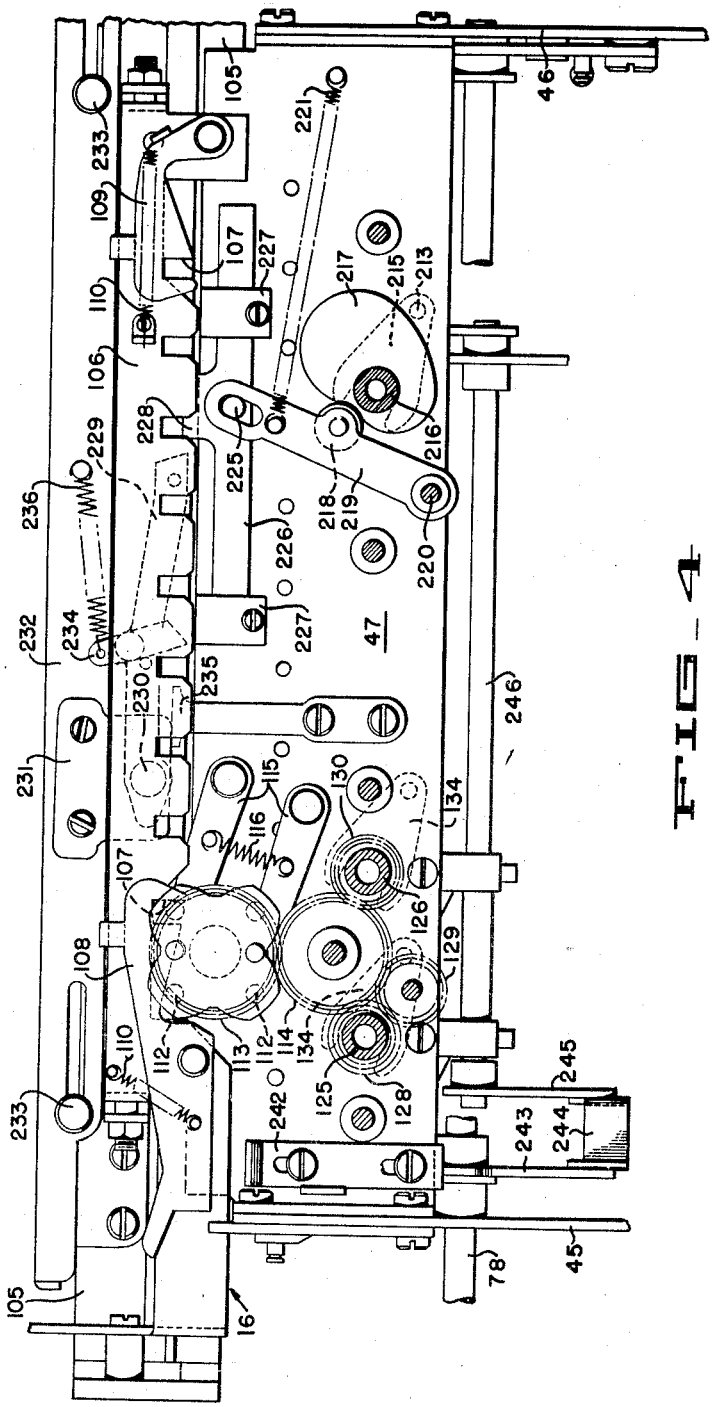

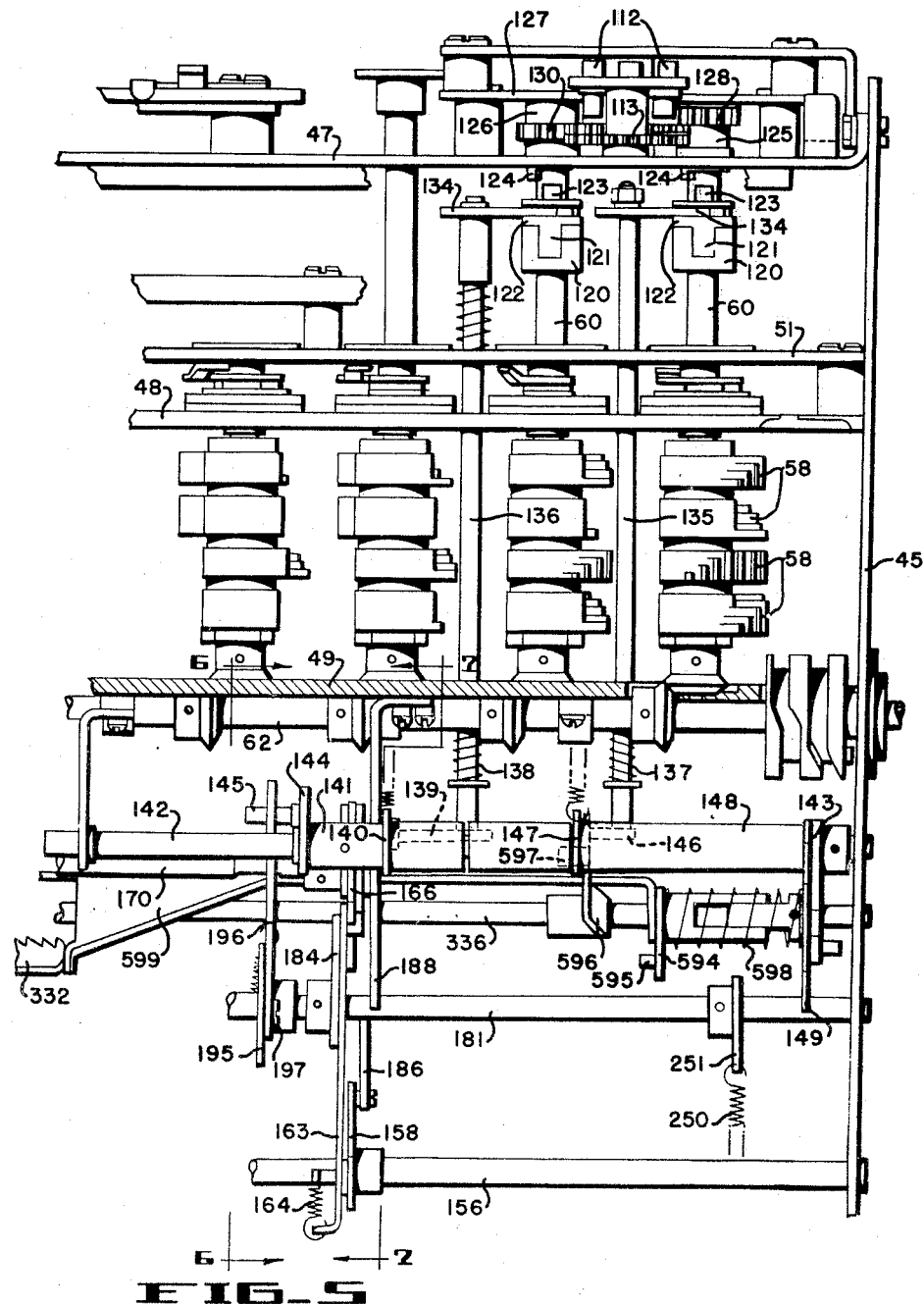
FIG_5

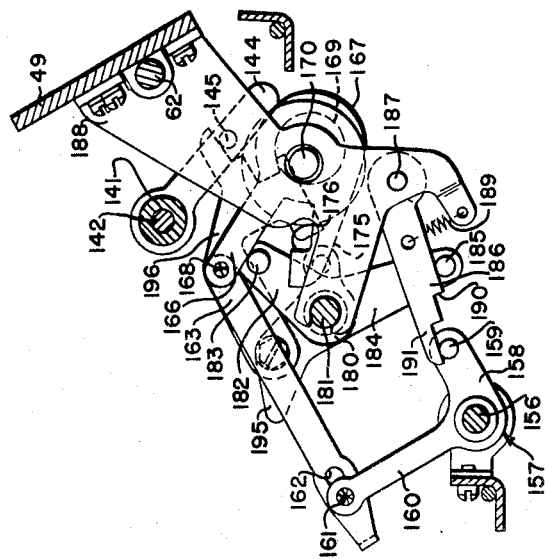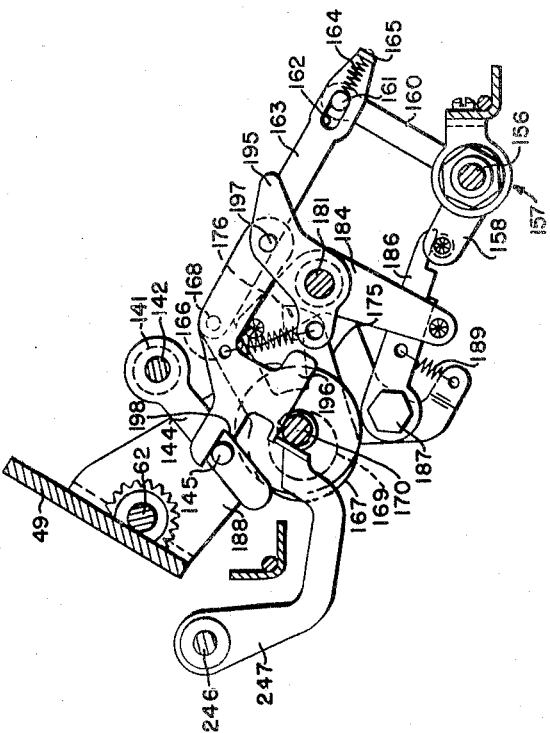

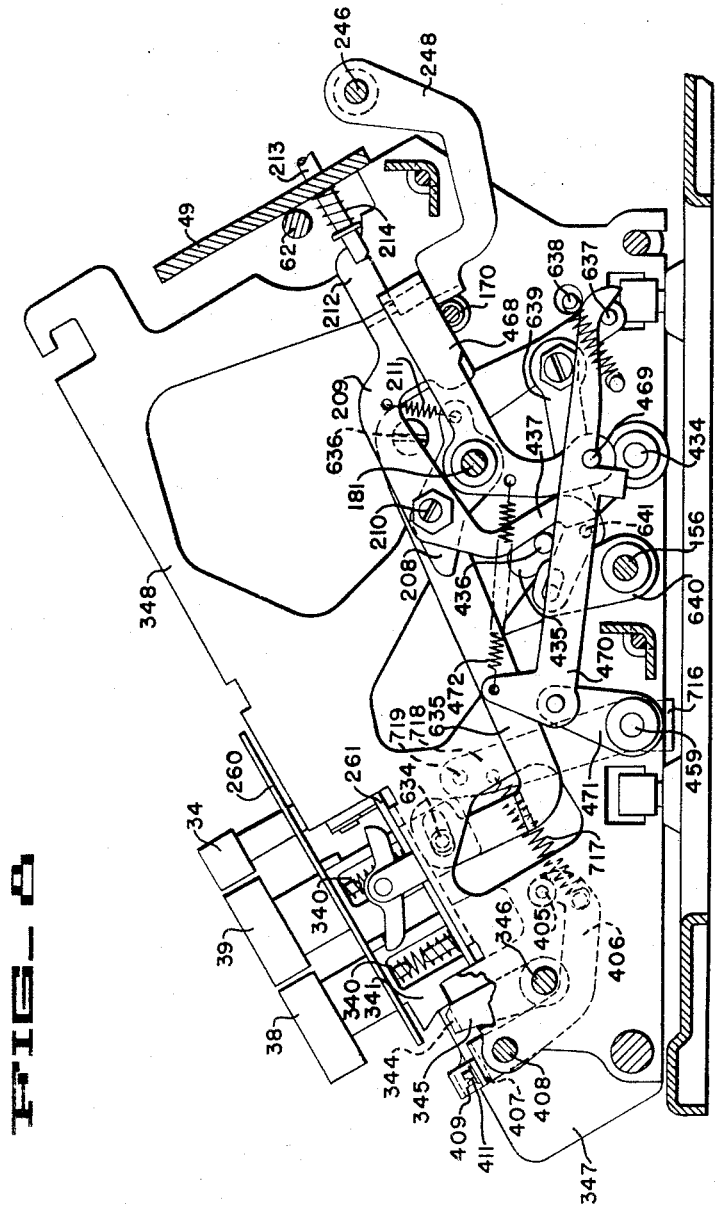

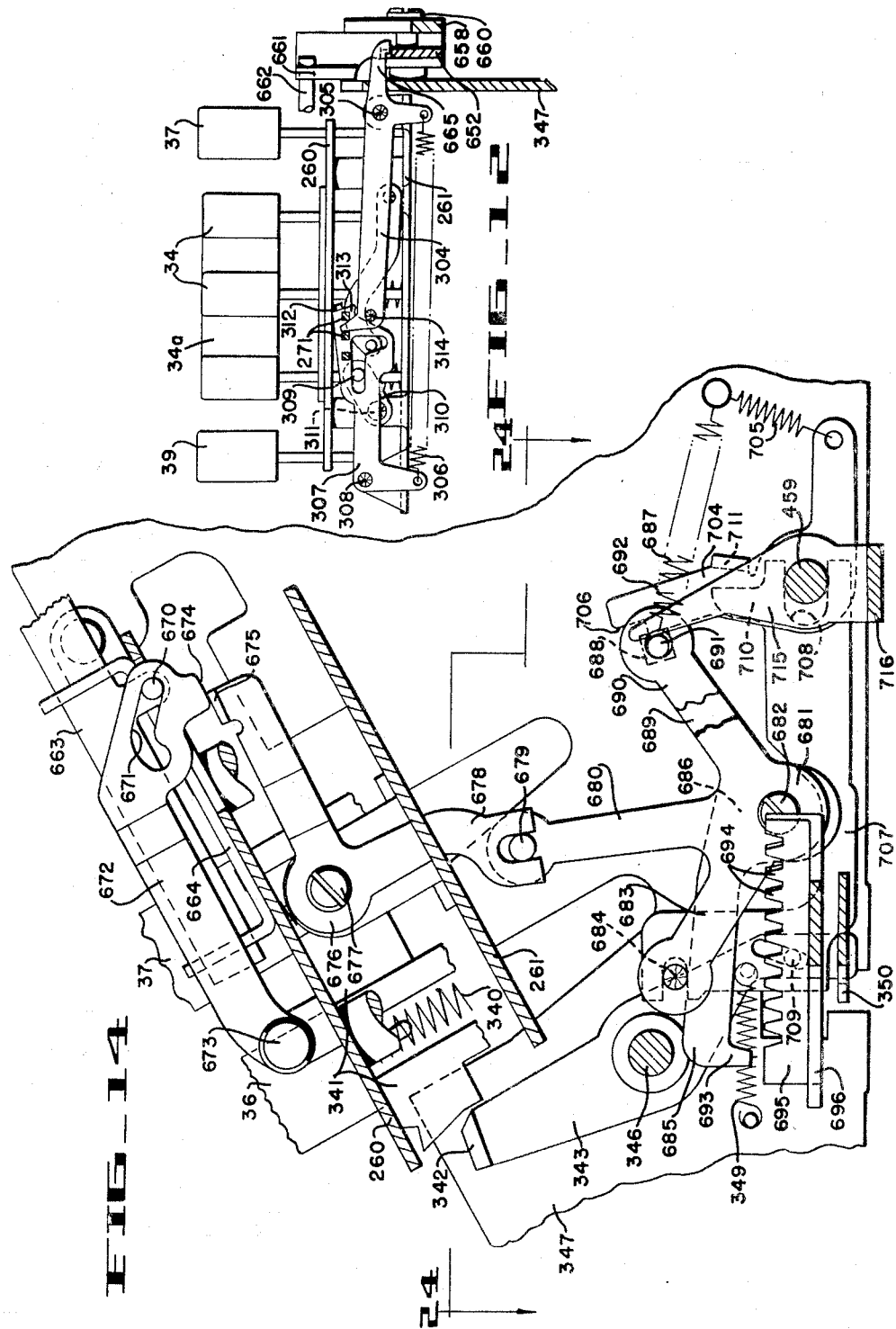

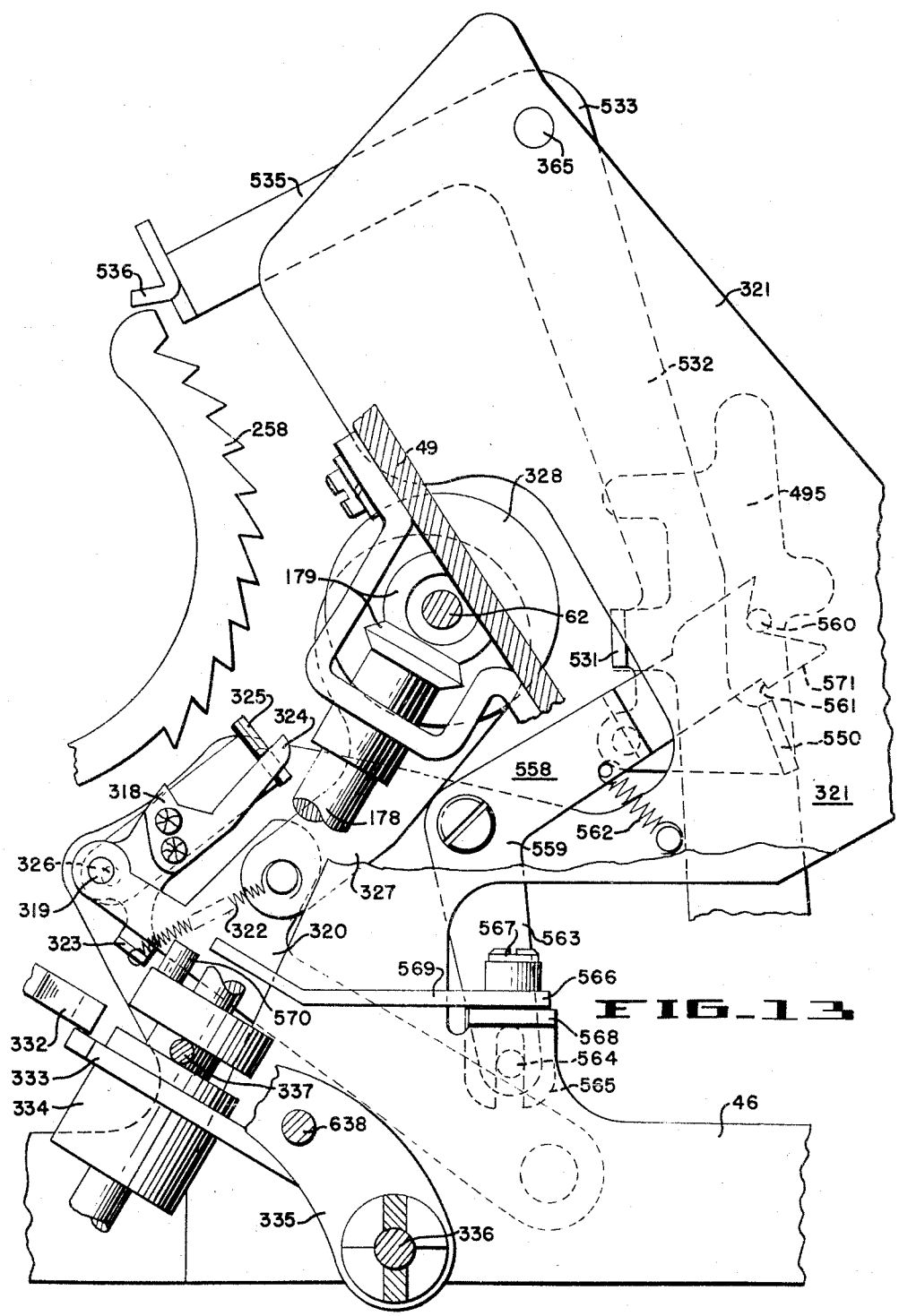

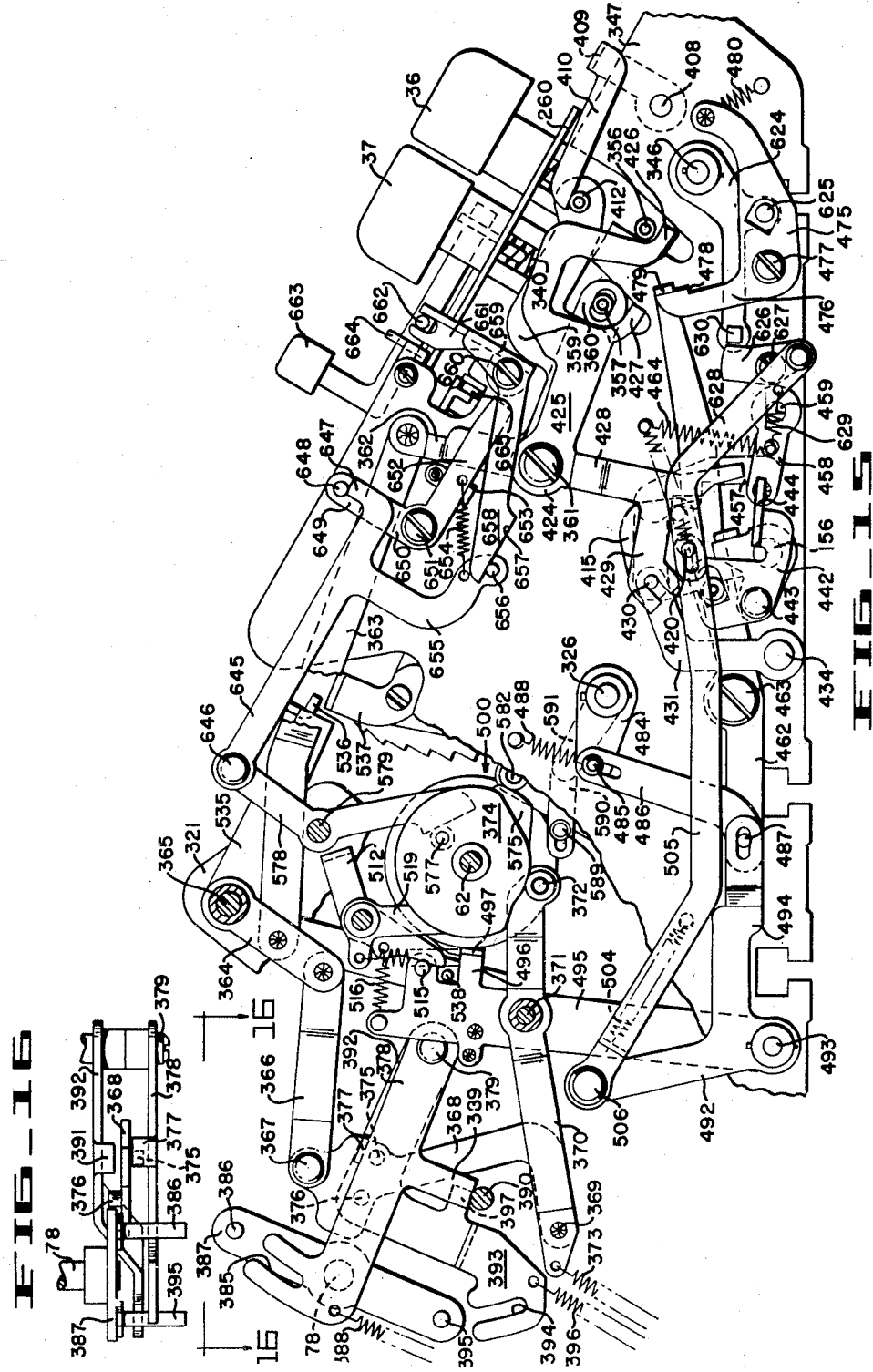

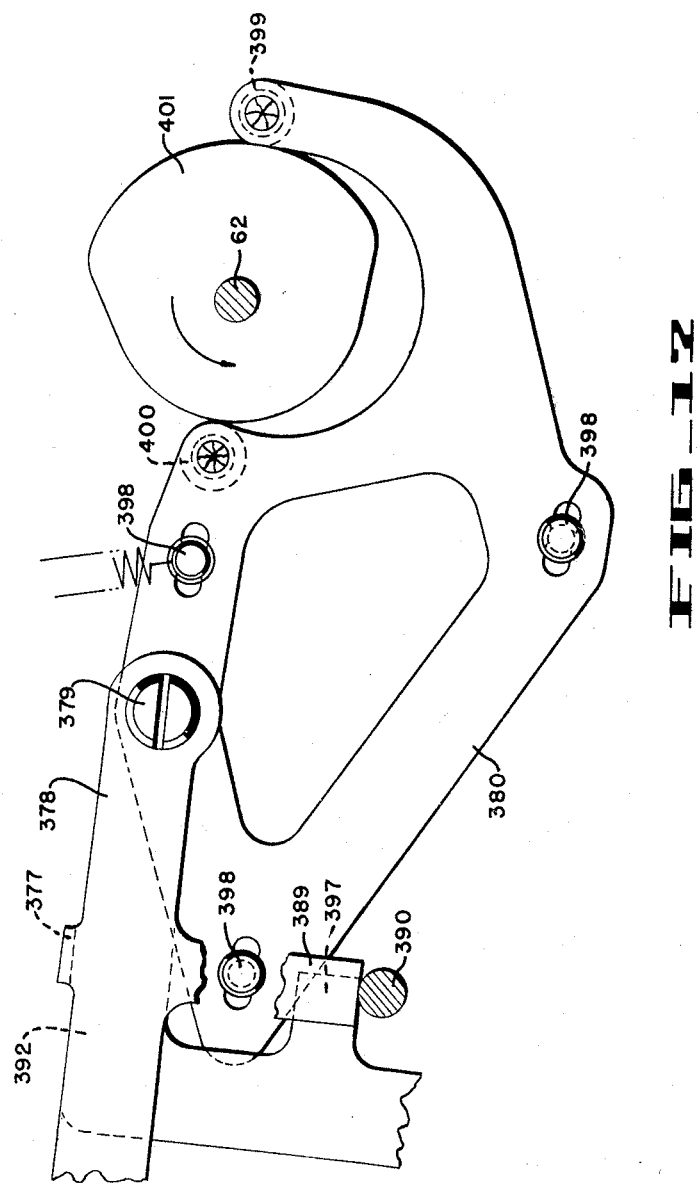
FIG_12

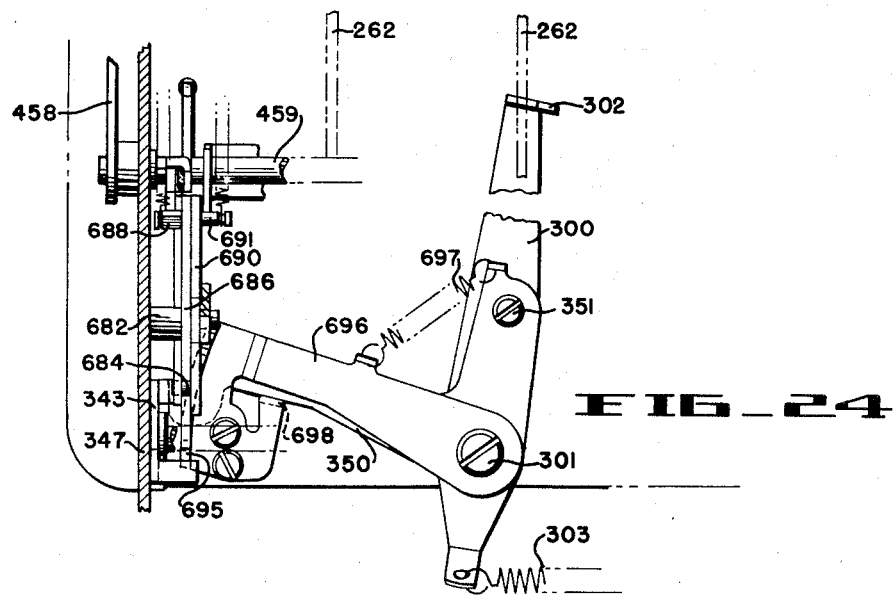
FIG_24
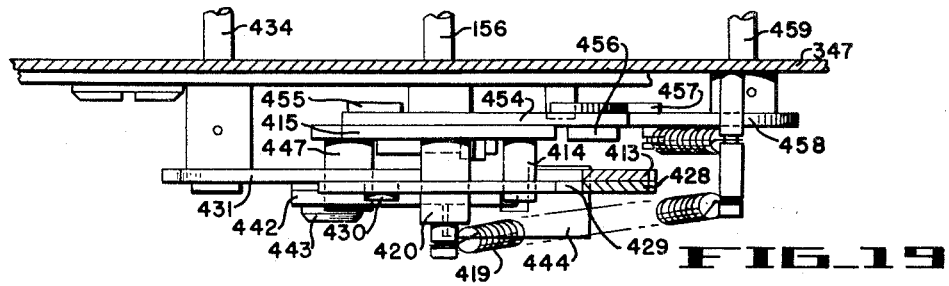
FIG_19
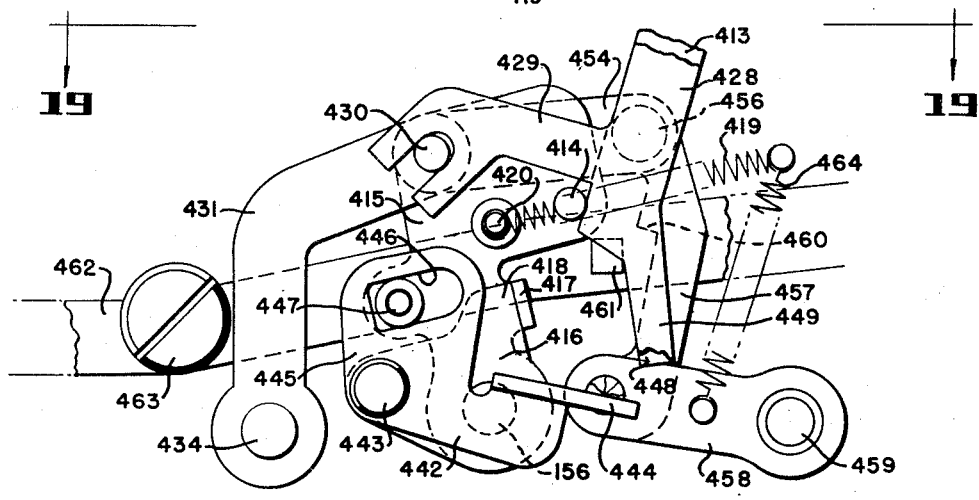
FIG_18

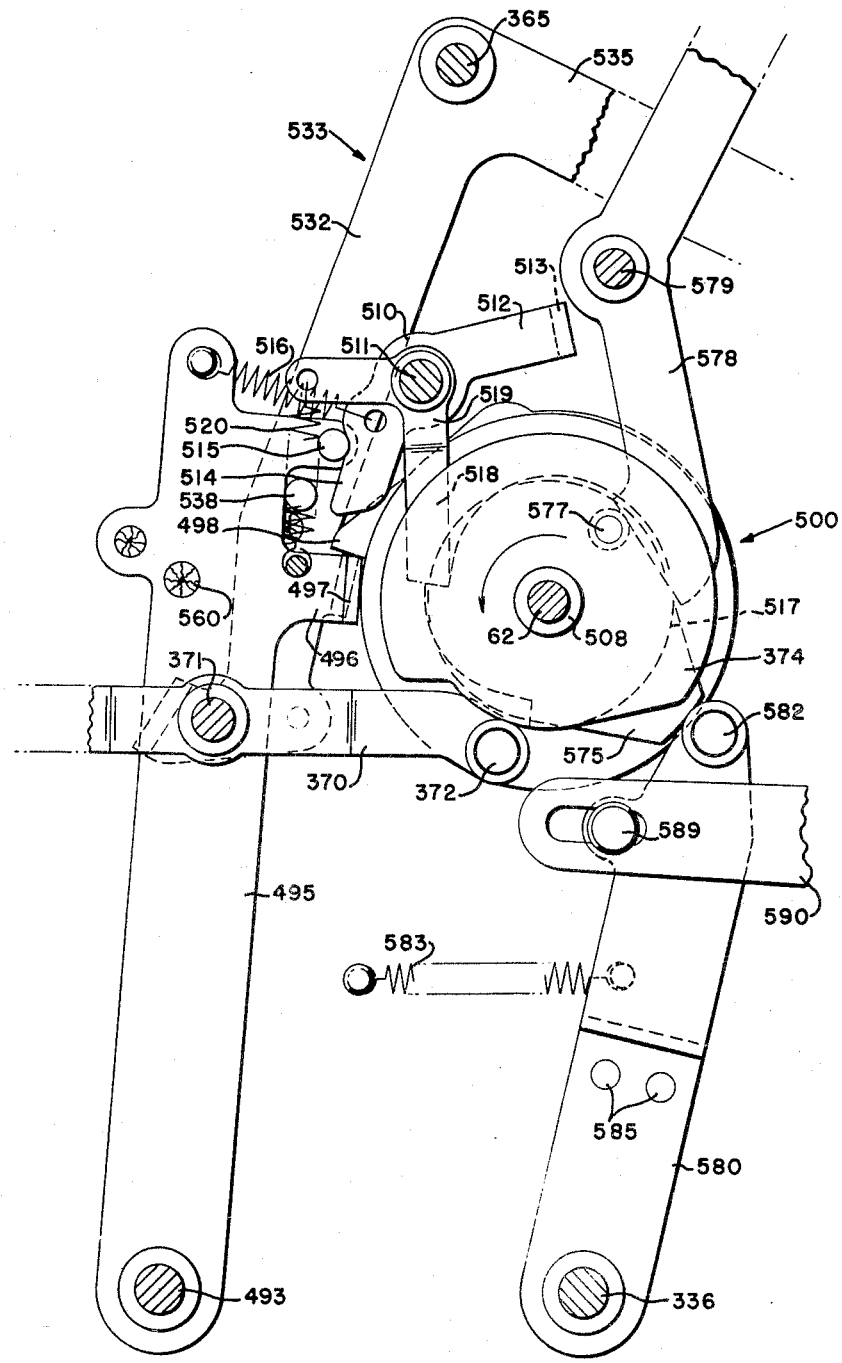
FIG_20

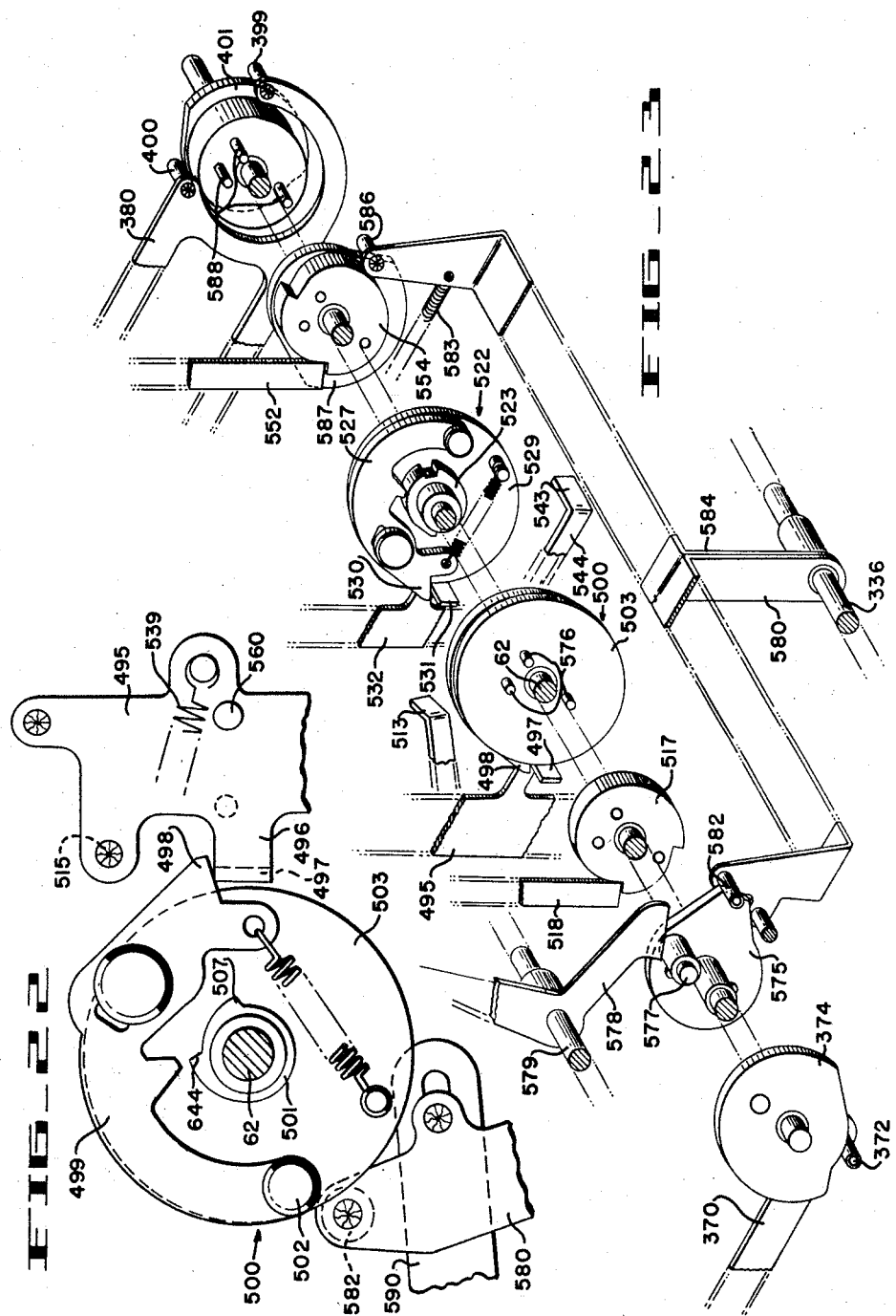

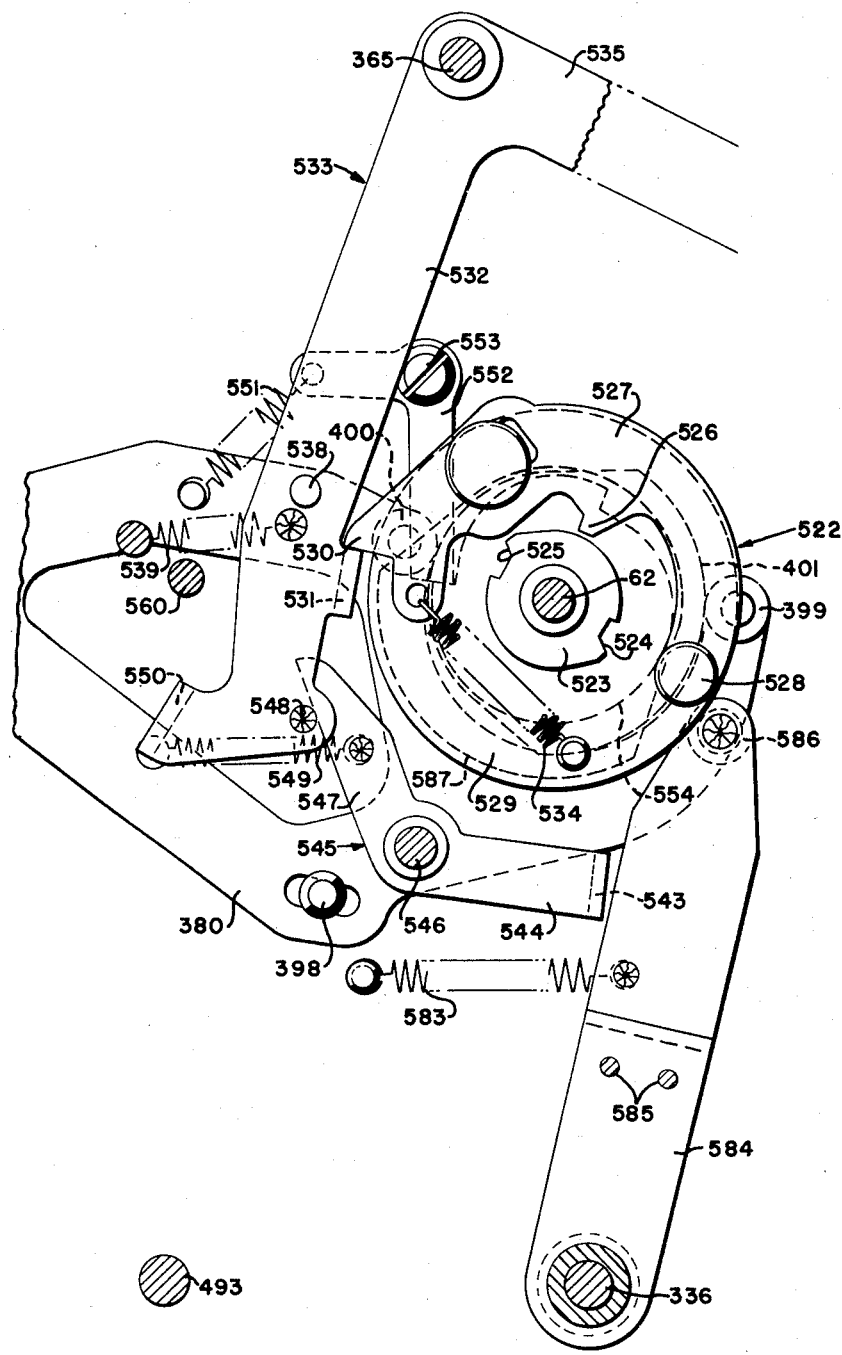
FIG_21

United States Patent Office 2,935,254
Patented May 3, 1960

2,935,254
CALCULATING MACHINE

Gilman Plunkett, San Leandro, Calif., assignor to Friden, Inc., a corporation of California Application January 4, 1954, Serial No. 401,780

19 Claims. (Cl. 235—63)

INDEX

| | Column |
|---|---|
| I. Selecting and actuating mechanism | 4 |
| II. Plus-minus keys | 5 |
| III. Drive mechanism | 5 |
| IV. Carriage shift mechanism | 5 |
| V. Revolutions counter | 6 |
| VI. Return and resetting mechanism | 7 |
| VII. Multiplication mechanism | 9 |
| VIII. Multiplier keyboard | 10 |
| IX. Multiplier carriage | 10 |
| X. Multiplier carriage escapement mechanism | 12 |
| XI. Pin carriage shifting means | 14 |
| XII. Multiplication keys | 14 |
| XIII. Registration sign character control | 15 |
| XIV. Carriage return and resetting control | 16 |
| XV. Multiplier feed enabling mechanism | 19 |
| XVI. Multiplication control mechanism | 20 |
| XVII. Accumulator and pin carriage shift control | 22 |
| XVIII. Pin restoring means | 26 |
| XIX. Multiplication control key release | 27 |
| XX. Multiplier correction | 29 |
| XXI. Multiplier repeat mechanism | 30 |
| XXII. Multiplying operation | 34 |

This invention relates to calculating machines and is concerned more particularly with the provision of improved means for performing plural order multiplication operations automatically.

It is a general object of the invention to provide an improved calculating machine in which plural order multiplying operations may be controlled in a more expeditious manner.

Another object of the invention is to provide an improved calculating machine in which the sign character of a multiplying operation may be selectively controled.

Another object of the invention is to provide an improved multiplying mechanism in which the register is conditioned by power-operated means for additive or substractive product registrations as determined by selected manually operable control keys.

Another object of the invention is to provide an improved plural order multiplying mechanism for a calculating machine in which the sign character of a product is controlled by a clutch-operated means upon manipulation of a selected key.

Another object of the invention is to provide an improved calculating machine with a power transmission mechanism including a plurality of clutches utilized in combination to control a plurality of operations.

A further object of the invention is to provide an improved calculating machine in which a clutch-operated means is effective to condition the register for a product registration during a plural order multiplying operation.

A further object of the invention is to provide an improved calculating machine in which sequential shifting of the product register is clutch-controlled during plural order multiplying operations.

Another object of the invention is to provide an improved plural order multiplying mechanism for calculating machines in which the various machine controls are clutch-operated.

Another object of the invention is to provide an improved plural order multiplying mechanism for calculating machines in which the multiplier selection mechanism and the setting means therefore are automatically and simultaneously restored to a zeroized and ineffective position upon termination of a multiplying operation.

Other objects and advantages of the invention will be apparent from the following description of a preferred embodiment taken in connection with the accompanying drawings, in which:

Fig. 4 is an elevational view of the upper rear portion of the machine.

Fig. 5 is a partial plan view showing especially the carriage shifting mechanism of the machine taken beneath the keyboard.

Fig. 6 is a fragmentary left side view of the power setting control taken along the longitudinal plane indicated by the line 6—6 of Fig. 5.

Fig. 7 is a fragmentary right side view of the mechanism shown in Fig. 6 and taken along the longitudinal plane indicated by the line 7—7 of Fig. 5.

Fig. 8 is a right side elevational view, partly in section of a portion of the multiplication control mechanism taken along the longitudinal plane indicated by the line 8—8 of Fig. 1.

Fig. 9 is a right end elevational view of the multiplier pin carriage showing the pin restore mechanism and multiplier zeroizing mechanism.

Fig. 10 is an enlarged sectional detail of the setting pins in the multiplier carriage.

Fig. 11 is a vertical fragmentary sectional view of the pin carriage taken along the transverse plane indicated by the line 11—11 of Fig. 9.

Fig. 12 is a rear elevational view of the multiplier keyboard showing the escapement mechanism for the pin carriage.

Fig. 13 is a sectional elevational view of a portion of the multiplier control mechanism.

Fig. 14 is a fragmentary sectional elevational view of the repeat multiplier control mechanism.

Fig. 15 is an elevational view of the left side frame of the machine with a portion thereof broken away to more clearly show a portion of the multiplication mechanism.

Fig. 16 is a plan view showing the sign character control mechanism, the view being taken along the horizontal plane indicated by the line 16—16 of Fig. 15.

Fig. 17 is an enlarged detail of the plus-minus gate setting control.

Fig. 18 is an enlarged detail of the interlock and multiplication initiating control on the left side frame of the machine.

Fig. 19 is a fragmentary plan view of the interlock and multiplication initiating control taken along the horizontal plane indicated by the line 19—19 of Fig. 18.

Fig. 20 is an enlarged sectional elevational view of the sign character conditioning clutch and a portion of the control mechanism thereof.

Fig. 21 is an enlarged sectional elevational view of the clutch control for setting the plus-minus gate and operating right shift mechanism.

Fig. 22 is an enlarged detail of the sign character conditioning clutch.

Fig. 23 is a perspective view of the operational control clutches and the respective power members controlled thereby.

Fig. 24 is a plan view of the pin carriage left shift actuating mechanism and the repeat multiplier control mechanism, the view being taken along the horizontal planes indicated by the lines 24—24 of Fig. 14.

The invention is illustrated in connection with the type of calculating machine having a unidirectionally operable actuator and reversible, or bidirectionally operable, numeral wheels. The invention is an improvement of the multiplying mechanism disclosed in the patent to C. M. Friden, No. 2,371,752, issued March 20, 1945, and the patent to Friden et al., No. 2,399,917, issued May 7, 1946, each of which improvements are incorporated in the machine disclosed in the patent to Carl M. F. Friden, No. 2,229,889, issued January 28, 1941. While certain features of my invention are adapted particularly for use in this type of machine, certain of such features and other features of the invention can be used in other types of calculating machines.

Figure 1:
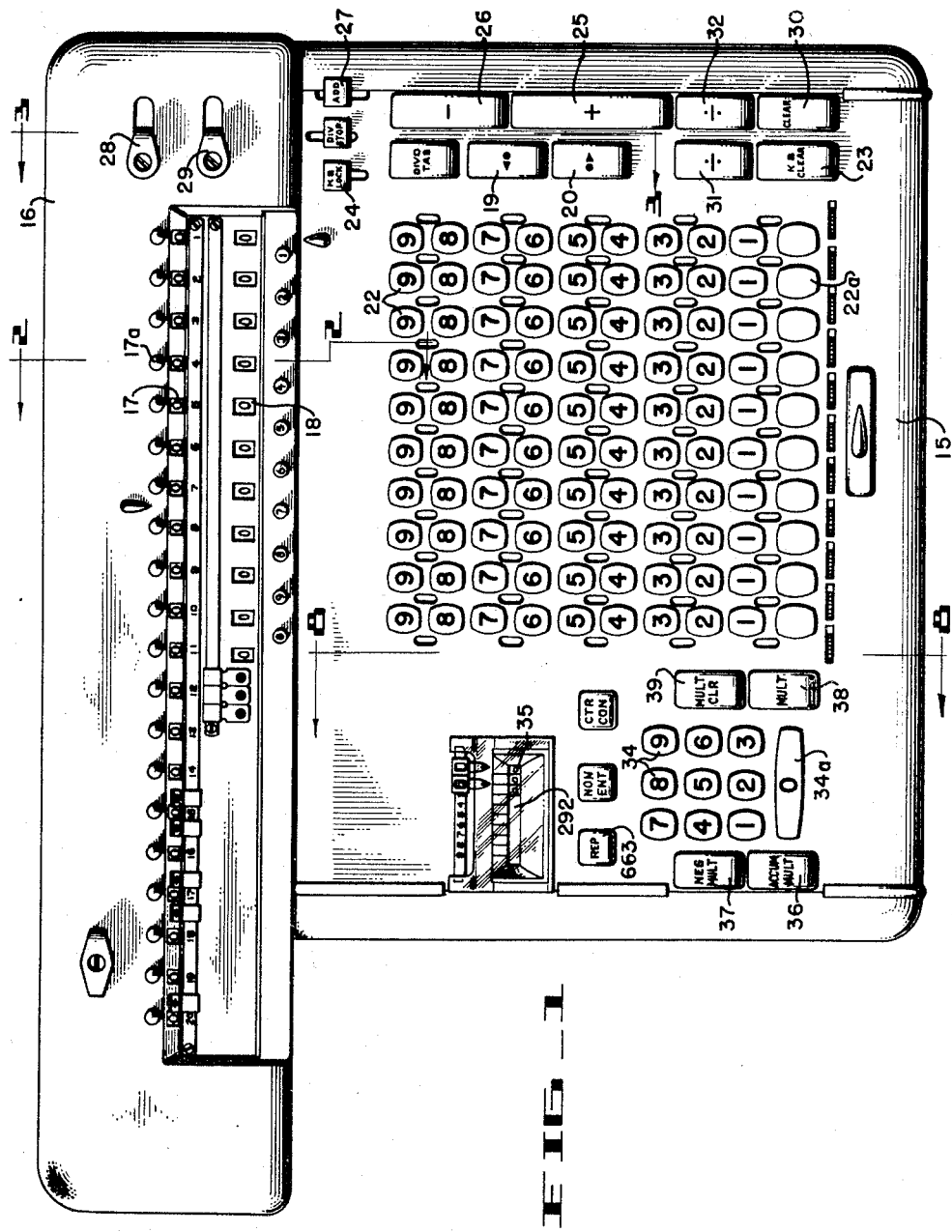
Fig. 1 is a plan view of the calculating machine embodying the invention.

Referring to Fig. 1, the machine includes a body 15 in which the actuating, selecting, and control mechanisms are mounted, and a carriage 16 which is mounted for endwise shifting movement transversely of the body 15 and which carries numeral wheels 17 and 18 of the accumulator and revolutions counter, respectively. Numeral wheels 17 are provided with projecting twister handles 17a to provide for individual setting thereof. Carriage 16 can be shifted by power in either direction by manipulation of respective shift keys 19, 20 through conventional clutches described hereinafter.

Values are entered into the machine by depression of numeral keys 22 of the usual keyboard in the various ordinal rows thereof, keys 22 being releasable individually by depression of ordinal clear keys 22a or collectively by depression of keyboard clear key 23. The value set into the keyboard may be locked therein by proper setting of keyboard lock lever 24. Values introduced into the machine may be registered additively or subtractively on accumulator numeral wheels 17 by depression of plus key 25 or minus key 26, respectively. If desired, "add" key 27 may be moved forwardly to cause clearing of the keyboard in the usual manner after a single registration in the accumulator.

Values registered in numeral wheels 17 and 18 can be erased, i.e., the registers can be zeroized, by manipulation of respective manually operable resetting handles 28, 29, or by power through depression of return and clear key 30. Depression of key 30 first effects return of carriage 16 to the farthest left position and subsequently effects resetting of both the accumulator 17 and the counter 18, either or neither, depending upon the setting of resetting handles 28, 29 which are adjustable to control such selective resetting.

The machine is adapted to perform automatic plural order division by means of conventional construction including division starting control keys 31, 32. Automatic predetermined multiplication can also be performed by depression of multiplier selection keys 34 to set up the desired multiplier figure as indicated on dials 35 and by depression of one of multiplication control keys 36, 37 or 38 to start the multiplying operation. If positive or negative accumulative multiplication is desired, the operation is begun by depression of accumulative multiply keys 36 or 37 which do not initiate an operation of the resetting mechanism. However, upon depression of key 38 the multiplying operation is begun with a shift of the carriage to the left, followed by an operation of the resetting mechanism. If it is desired to correct an erroneously entered multiplier figure, multiplier correction key 39 may be depressed to zeroize the multiplier selection mechanism. The multiplying mechanism and the associated control means form the principal subject matter of the instant invention and are described later in detail.

With the above general organization of parts in mind, various of the above-noted mechanism will be described in detail insofar as being necessary or desirable to an understanding of the present invention, it being understood that the mechanism which is not described fully may be of conventional construction, such as that disclosed in the aforementioned patents to Friden, Nos. 2,229,889 and 2,371,752, and Friden et al., No. 2,399,917.

I. *Selecting and actuating mechanism*

Within casing 15 the frame includes right and left side frames 45, 46 (Figs. 2 and 3) which are suitably mounted on the machine base and are interconnected by various crossframe members, including transverse frames 47, 48, 49 and 50 for supporting various mechanisms including the selecting and actuating mechanism.

The values to be introduced into accumulator numeral wheels 17 are selected by means of a plurality of similar orders of selecting mechanism associated with numeral keys 22. For this purpose each ordinal row of keys 22 (Fig. 2) cooperates with a pair of similar parallel springurged value-selecting slides 54, mounted for endwise movement by a suitable supporting linkage and extending through suitable slots in crossframe plate 49. Each slide 54 is provided with cam surfaces of varying inclination for cooperation with suitable pins on certain keys 22 to effect a differential movement of slide 54 on depression of a key 22. One slide 54 of each order cooperates with the "1" to "5" keys 22 of a row, while the other slide 54 of the same order cooperates with the "6" to "9" keys 22 of the row.

Each ordinal row of keys 22 (Fig. 2) has a latching slide 55 of conventional construction associated therewith to latch any depressed key 22 releasably in depressed position against the tension of a spring associated therewith. To release depressed numeral keys 22, the latching slides 55 may be operated in any convenient manner by zero and clear keys 22a and 23 and by power as controlled by manipulation of "add" key 27.

Each selecting slide 54 (Fig. 2) is connected at its rear end with a 10-tooth gear 56 slidably and nonrotatably mounted on longitudinal square shaft 57, whereby movement of slide 54 serves to position the associated gear 56 on shaft 57 with respect to stepped teeth on the associated actuating cylinder 58 in accordance with the value of the depressed numeral key 22. A pair of actuating cylinders 58 for adjacent orders of the machine are mounted on each longitudinal actuating shaft 60 which is suitably journalled in crossframes 49 and 51 and has a suitable bevel gear connection with transverse driving shaft 62. Shaft 62 is operable cyclically in a single direction from clutch-control driving means, as described hereinafter, to provide the only path of power flow from the motor.

Figure 2:
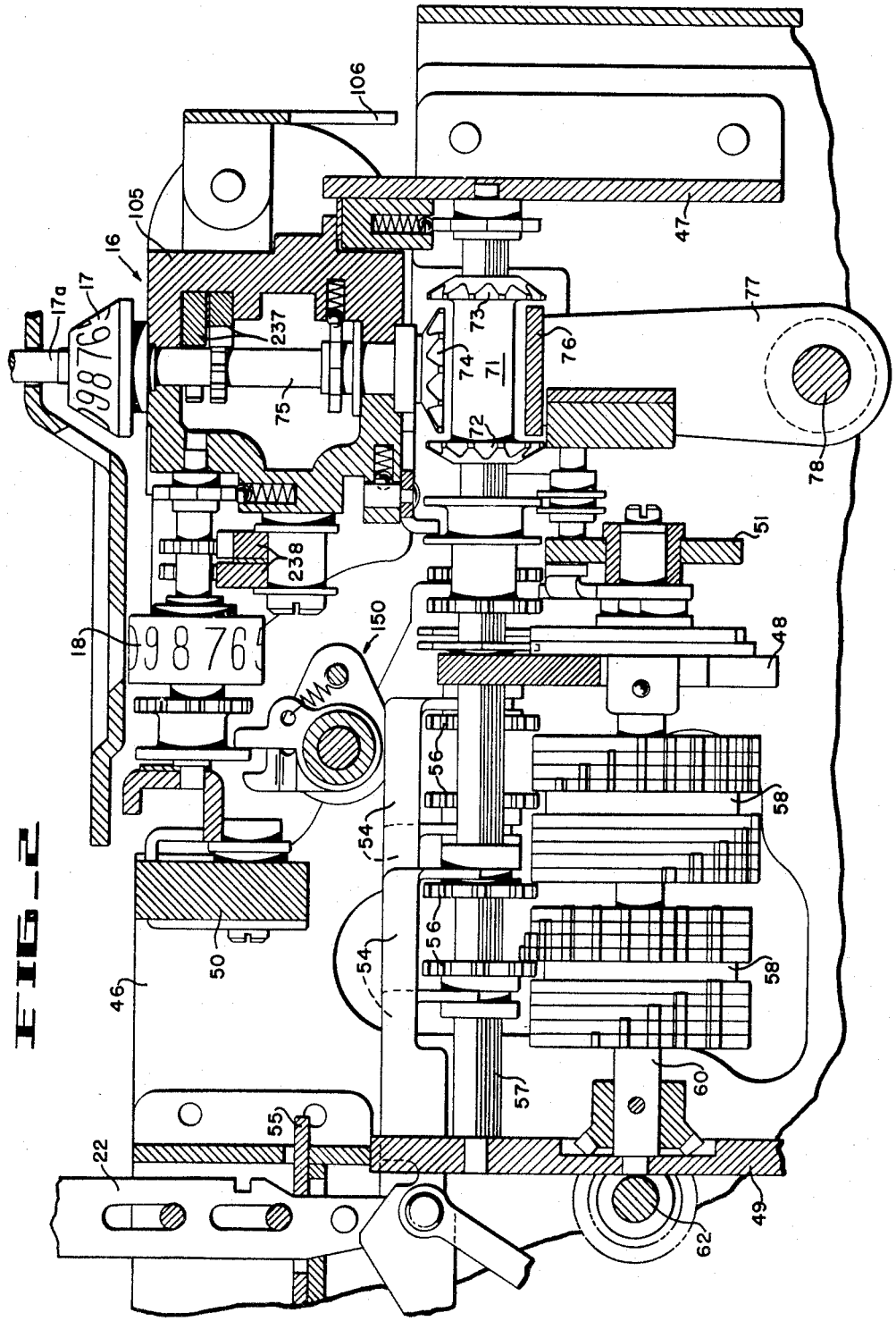
Fig. 2 is a longitudinal sectional elevation of the actuating and registering mechanism of the machine taken on the longitudinal vertical planes indicated by the lines 2—2 of Fig. 1.

As seen in Fig. 2, the pair of square shafts 57 associated with each actuating shaft 60 are positioned above and to either side of the actuating shaft. In addition, the sets of gears 56 on respective square shafts 57 are offset longitudinally of the machine for cooperation with the similarly offset actuating cylinders 58. By the above arrangement and upon each rotation of the actuating means, a selected number of increments of movement can be imparted to each shaft 57 by the associated actuating cylinder 58 in accordance with the adjusted position of gears 56.

Each shaft 57 (Fig. 2) is suitably journalled in crossframe members 47, 48 and 49, and between plates 47 and 48 has associated therewith selectively settable plus-minus gears for driving an aligned numeral wheel 17. The plus-minus gears of each order of the machine include a spool 71 slidably and nonrotatably mounted on shaft 57 and having opposed 10-tooth bevel gears 72, 73 arranged for selective engagement with gear 74 on numeral wheel shaft 75. The engagement of gears 72 and 73 with gear 74 is controlled by strap 76 which extends transversely of the machine between each set of plus-minus gears 72, 73 and is mounted by similar spaced arms 77 on transverse shaft 78 which is suitably journalled in side frames 45 and 46. Shaft 78 is controlled in a manner hereinafter described to determine positive registration by meshing gears 72 with gears 74 and negative registration by meshing gears 73 with gears 74. In the neutral position shown in Fig. 2 in which gears 72 and 73 may be held normally by suitable spring-urged centralizing means associated with strap 76, carriage shifting can be effected.

During both additive and subtractive registration of values in numeral wheels 17, suitable tens-transfer mechanism of conventional construction may be operative to effect the tens-transfer as disclosed, for example, in said Patent No. 2,229,889.

II. Plus-minus keys

As previously stated, the plus and minus keys 25 and 26 (Fig. 1) are adapted to control positive and negative registrations in the accumulator, and for this purpose they may be connected by suitable mechanism, not disclosed herein, to effect rocking of shaft 78 (Fig. 2), whereby plus key 25 serves to mesh gears 72 with numeral wheel gears 74 and minus key 26 serves to mesh minus gears 73 with numeral wheel gears 74. The plus and minus keys also serve to engage the clutch and close the motor circuit by suitable means. This mechanism may be of the type disclosed in said Patent No. 2,229,889.

III. Drive mechanism

As stated above, the actuating means is operable cyclically to effect registration in the accumulator of the values set into the machine by depression of the numeral keys. For this purpose a clutch and motor control means is provided for the actuating mechanism, which means preferably forms the sole drive means for all power-driven parts of the machine. The source of power for the drive means comprises an electric motor provided with drive shaft 82 (Fig. 3) carrying drive gear 83 which is connected by idler gear 84 with gear 85 journalled on transverse shaft 62 and carrying driving clutch element, or ratchet, 86 on its hub. Driven clutch element 87 is secured on shaft 62 and has pivoted thereon spring-urged clutch pawl 88 having a tooth for engagement with the teeth of ratchet 86 to establish the drive connection. Pawl 88 is spring-urged to operative position but is restrained in the neutral, or full-cycle, position of the parts by clutch-control lever 91 pivoted at 92 on side frame 45. Lever 91 carries roller 93 which seats in a depression on clutch element 87 in the full-cycle position thereof and in other positions thereof maintains lever 91 in its clutch-engaging position for a purpose later referred to.

It is seen therefore that one or more cycles of operation of the actuating mechanism can be determined by oscillation of clutch-control lever 91.

Simultaneously with movement of control lever 91, the circuit for the motor is established and for this purpose pin 94 on the upper arm of clutch-control lever 91 is connected by link 95 with lever 96 pivoted at 97 on side frame 45, which lever is connected at its lower end by a pin-and-slot engagement with lever 98, also pivoted on plate 45. Lever 98 has a suitable insulated pin in overlapping relation with a spring-mounted contact 99 normally spaced from a similar contact 99. Thus, clockwise movement of clutch-control lever 91 serves, through link 95 and lever 96, to oscillate lever 98 in a counter-clockwise direction, whereby contacts 99 are engaged to establish the circuit for the motor. It will be noted that roller 93, in maintaining control lever 91 in clutch-engaging position, when the actuating means is out of full-cycle position, also serves to maintain contacts 99 closed so that the motor circuit can be interrupted only in the full-cycle position of the parts.

IV. Carriage shift mechanism

Means are provided for shifting the carriage in either direction from one ordinal position to another by power-driven means controlled by manually operable keys. The power-driven means preferably comprises elements of the actuating means for entering values into the accumulator register. Carriage 16 (Fig. 4) includes frame 105 having toothed shift rack 106 extending along the rear side thereof with its ends suitably supported on frame 105. The end slots 107 of the rack are formed in part by respective yieldable pawls 108 and 109 having respective springs 110 associated therewith. Slots 107 are adapted for engagement by shift pins 112 equiangularly disposed on shift gear 113 suitably journalled on cross plate 47. Shift gear 113 (Figs. 4 and 5) can be rotated selectively in either direction through idler gear 114 to shift the carriage through any desired number of ordinal spaces, each 90 degree rotation of gear 113 effecting one ordinal spacing of the carriage. Shift gear 113 is centralized by means of a cam and centralizing arms 115 having a suitable spring 116 connected therebetween.

In order to rotate shift gear 113 selectively in either direction, the two right-hand actuating shafts 60 (Fig. 5) are extended and are provided with similar controllable drive connections with gear 113. Each connection includes a collar 120 fixed on the associated shaft 60 adjacent the end thereof, and having diametrically positioned slots slidably engaged by corresponding teeth 121 of shiftable collar 122, which is mounted for sliding movement at the end of shaft 60. Respective collars 122 are provided with a rearwardly extended arcuate portion 123 for operative engagement with corresponding teeth 124 of gear sleeves 125, 126. Gear sleeve 125 is suitably journalled in cross plate 47 and bracket 127 secured in spaced relation on plate 47 and carries gear 128 meshing with wide idler gear 129 (Fig. 4), which also meshes with idler gear 114. Similarly, gear sleeve 126 has gear 130 which meshes with idler gear 114 and has a similar controllable drive connection with an actuating shaft 60.

Thus, by selective shifting of collars 122 to establish a drive connection, rotation of one of actuating shafts 60 may be utilized to determine rotation of shift gear 113 in a selected direction to effect shifting of carriage 16 in either direction.

Similar mechanisms are provided to control shifting of collars 122. Each mechanism includes a fork 134 (Figs. 4 and 5) at the rear end of respective rods 135 and 136 and engaging a suitable annular groove in the associated collar 122. Each of the rods 135, 136 is suitably mounted on the frame for endwise movement and is spring-urged to the position shown in Fig. 5 by respective springs 137 and 138. Left shift rod 136 has associated therewith a pin 139 (Fig. 5) carried by arm 140 depending from sleeve 141 secured on shaft 142, which shaft also carries arm 143. Integral with arm 140, sleeve 141 carries depending arm 144 having a pin 145 for operative control of push rod 136, as will be described hereinafter. Shaft 142 and integral arms 140, 144 may be oscillated through arm 143 by shift key 19 to move the associated rod 136 rearwardly. Rod 135 is engaged by pin 146 carried on arm 147 depending from one end of sleeve 148 which carries arm 149 at its other end for operation by shift key 20. Keys 19 and 20 operate to cause oscillation of arms 143, 149 and engagement of the clutch and closing of the motor circuit in a conventional manner.

Thus, carriage 16 carrying numeral wheels 17, 18 can be shifted selectively in either direction through one or more ordinal positions by depression of keys 19 and 20 to control the cyclic operation of the actuating means.

V. Revolutions counter

Numeral wheels 18 (Figs. 1 and 2) of the revolutions counter register the number of actuations of accumulator numeral wheels 17 in a conventional manner by the operation of counter actuator 150, as disclosed, for example, in said Patent No. 2,229,889.

VI. *Return and resetting mechanism*

The return clear key 30 and the multiplication key 38 operate to cause a return clear operation, that is, a shift of the carriage to the left end position where the accumulator is cleared, or zeroized. The operation of the power-setting mechanism for lightening the key touch on each of these operation control keys will be described briefly in connection with the return clear key 30. Depression of the key 30 operates through mechanism not considered pertinent to the invention, and therefore not shown herein, to rock shaft 156, counter-clockwise as seen in Fig. 6 and clockwise in Fig. 7. Shaft 156 is similarly rocked upon depression of the multiplication keys 36, 37, and 38 by mechanism to be described hereinafter.

Shaft 156 carries bellcrank 157 having lower arm 158 provided with a stud 159 for purposes hereinafter mentioned, and upper arm 160 which is provided with a stud 161. The stud 161 is embraced in a slot 162 in one end of link 163, the link being resiliently retracted by spring 164 which connects stud 161 to the formed-over ear 165 on the adjacent end of link 163. The other end of link 163 is pinned to arm 166 of hooked member 167 by any suitable means, such as pin 168. The hooked member 167 is rotatably mounted on eccentric 169 pinned to the shaft 170. The hooked member is provided with a second arm 175, the other end of which is provided with a hook 176.

The shaft 170 is connected at its one end by means of bevel gears 177 to a shaft 178 (Fig. 9) which, in turn, is connected by bevel gears 179 (Fig. 13) to main drive shaft 62. By this means, the shaft 170 is rotated in synchronism with the main drive shaft. It is thus obvious that the hooked member 167 continuously rocks on its eccentric mounting in synchronism with the main drive shaft whenever the main clutch 87 is engaged and the motor contacts are closed.

A bellcrank 180 is pinned to shaft 181 in a plane immediately adjacent to that of the hook 176. The upper arm 182 of the bellcrank is provided with a stud 183 which, when the hooked member 167 is rocked clockwise with the rocking of the shaft 156, will be engaged by the hook 176 during its continuous reciprocation. However, when shaft 156 is in its inactive position, the counter-clockwise position shown in Fig. 7, reciprocating hook 176 cannot engage stud 183. When the hook 176 is rocked to its operative position, the leading edge thereof is moved into engagement with the stud 183, causing tensioning of the spring 164. Upon cycling of the machine, the initial 180 degrees rotation of shaft 170 serves to move hook 176 to a position above stud 183 whereupon the tensioned spring 164 operates to move hook 176 into engagement therewith. The second 180 degree rotation of shaft 170 then becomes effective to rock bellcrank 180 clockwise as seen in Fig. 7. It will be understood that hook 176 is effective to pull bellcrank 180 and shaft 181 clockwise only after member 167 has been rocked clockwise by eccentric 169, otherwise the hook will not travel in a path which will bring it into engagement with stud 183.

Figure 3:
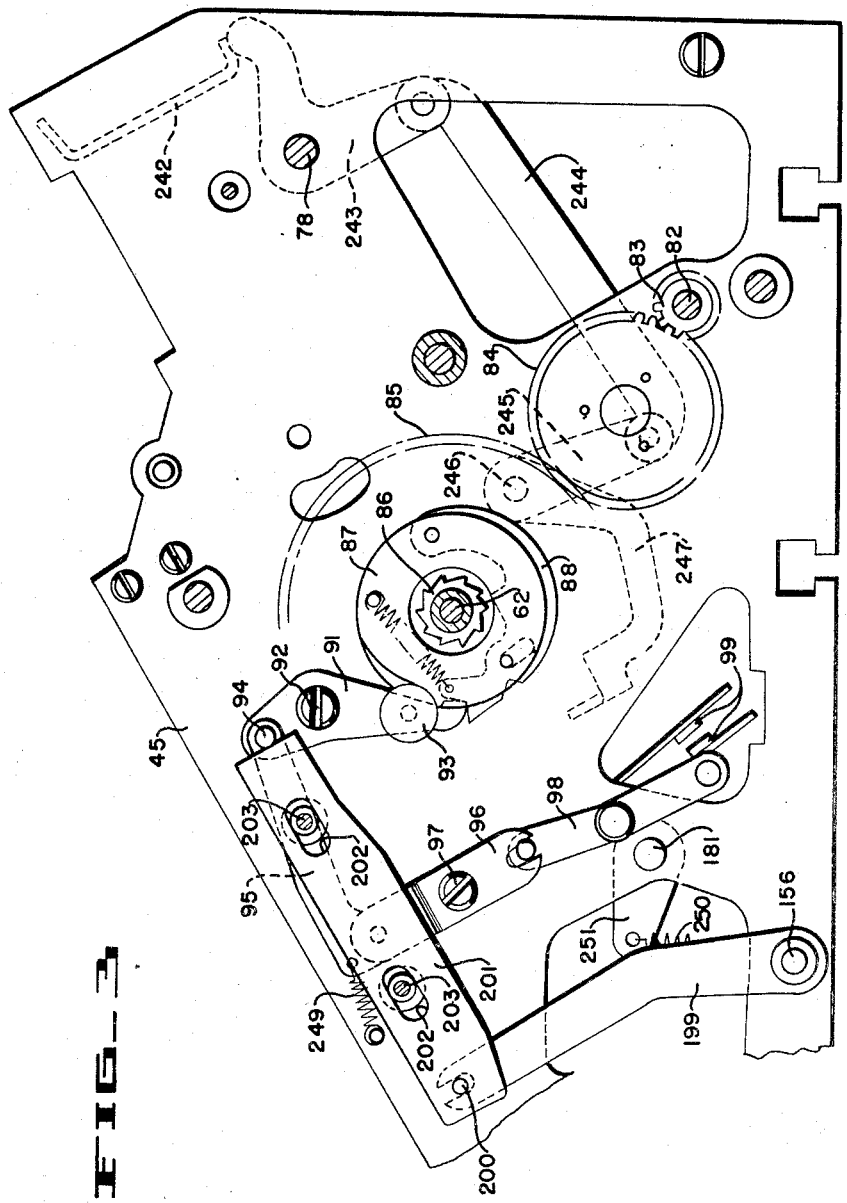
Fig. 3 is a sectional elevational view of the clutch-operating mechanism such as taken on the vertical plane indicated by the line 3—3 of Fig. 1 with certain parts removed, including the carriage, to more clearly show the driving mechanism.

The lower arm 184 of bellcrank 180 is provided with latching stud 185. Associated with the latching stud 185 is latching member 186 pivotally mounted at 187 on supporting bracket member 188. Latch 186 is urged counter-clockwise (Fig. 7) by spring 189 tensioned between the latch and the bracket 188. Shoulder 190 of latch 186 is adapted to engage pin 185 on arm 184, thereby latching the bellcrank 180 and shaft 181 in the operative position thereof. Latch member 186 is also provided with extension 191, which is engaged by the pin 159 on bellcrank 157 when the bellcrank and its shaft 156 are rocked in a counter-clockwise direction, as viewed in Fig. 7, thereby releasing latch 186 and enabling a counter-clockwise rotation of shaft 181 under the influence of spring 250 through arm 251 on shaft 181 (Figs. 3 and 5). When latched in its operative position, rocking of the eccentrically mounted hooked member 167 is effective to pull bellcrank 180 to its extreme latched position and is thereafter disengaged therefrom during substantially the entire part of each cycle of operation.

Upon depression of the return and clear key 30, clockwise rocking of shaft 156 (Figs. 3 and 7) serves to engage the clutch and close the motor contacts. For this purpose shaft 156 carries upstanding arm 199, the free end of which is bifurcated to engage stud 200 on slide member 201 which is mounted for reciprocatory movement by similar slots 202 therein embracing studs 203 in the framework of the machine. At its rearward end slide 201 abuts pin 94 of clutch control lever 91, so that clockwise rotation of shaft 156 moves member 201 rearward to engage the clutch and through link 95, levers 96 and 98, to close the motor contacts 99.

With the rocking of shaft 156 (clockwise in Figs. 3 and 7, counter-clockwise in Fig. 6) upon depression of key 30, the subsequent rocking of the shaft 181 causes engagement of the left shift clutch and the clear clutch, as will now be explained. Referring to Figs. 5 and 6, the shaft 181 has arm 195 secured thereto, on which pusher arm 196 is pivoted by any suitable means, such as pin 197. Pusher arm 196 has a shoulder 198 lying in operative relation to pin 145 of arm 144 which, it will be recalled, is integral with arm 140. Thus, it can be seen that upon rocking of shaft 181, pusher arm 196 is effective to rock arm 144 (clockwise in Fig. 6 or rearward of the machine as seen in Fig. 5), to rock arm 140 and pin 139, thereby moving left shift rod 136 rearward to engage the left shift clutch.

Rocking of shaft 181 also serves to enable the drive connection from the actuating means to the resetting drive means mounted on the frame of the machine. For this purpose, shaft 181 (Fig. 8) carries arm 208 having pusher link 209 pivoted thereon at 210 and urged by spring 211 to engage its notched end 212 with push rod 213 slidably mounted in bracket 48 and 49, and normally positioned, as shown in Fig. 8, by a spring 214. At its rearward end, rod 213 (Fig. 4) carries fork 215 operatively engaged with a shiftable toothed collar similar to shift collars 122 of the shift mechanism, and similarly mounted on one of actuating shafts 60. Rearward movement of the push rod 213 and fork 215 operates in a conventional manner to move the shiftable collar into driving engagement with sleeve 216 suitably journalled in bracket 47 and an auxiliary plate secured thereon (not shown). Sleeve 216 (Fig. 4) carries cam 217 which is engaged by roller 218 on arm 219 pivoted at 220 on bracket 47 and urged to follow cam 217 by spring 221. The upper end of arm 219 (Fig. 4) is slotted to engage pin 225 on slide 226 mounted for reciprocating movement on bracket 47 by small brackets 227. Hence, when carriage 16 is in its left-end position, as illustrated in Fig. 4, ear 228 formed at right angles to slide 226 is in operative relation with arm 229 pivoted at 230 on bracket 231 depending from resetting drive slide 232. Slide 232 has an L-shaped cross-section and is mounted for endwise sliding movement on carriage 16 by spaced studs 233. Reciprocation of slide 232 may be utilized in a conventional manner to reset either or both of the registers. Arm 229 has a "live" one-way acting pawl 234 pivoted thereon intermediate its ends to cooperate with fixed ledge 235 mounted on bracket 47 to lift arm 229 out of the path of ear 228 during movement of the carriage into its end position. Spring 236 urges arm 229 to the position shown against a suitable stop on the carriage frame. With the parts positioned as illustrated in Fig. 4, it is seen that upon movement of slide 226 to the left, ear 228 will engage the end of arm 229 to reciprocate resetting drive slide 232. The reciprocation of slide 232 is effected in the first cycle following the shifting of the carriage into the end position shown in Fig. 4.

Slide 232 may be operatively related to either or both of resetting rack bars 237 and 238 (Fig. 2) of the accumulator and counter, respectively, by the adjustment of settable operating handles 28 and 29 (Fig. 1) to adjust the connections therebetween. The foregoing description is believed to be sufficient for an understanding of the power-setting mechanism and its control of a return and clear operation. However, for a more complete disclosure of these mechanisms, reference is to be had to Patent No. 2,650,761 issued to Anthony B. Machado, September 1, 1953.

Key 30 may be latched in depressed position during shifting of the carriage to its end position if displaced therefrom and the latch may be released in a well-known manner during the first cycle of operation of the actuating means, when in said end position, under control of override pawl 108 (Fig. 4). Override pawl 108 also serves to interrupt operation of the shift and resetting drive connections after the first cycle (resetting cycle) following the shifting operation. For this purpose, slide 242 (Figs. 3 and 4) overlies an arm of bellcrank 243 pivoted on shaft 78 journalled in frame plates 45 and 46 and pivotally connected to link 244, which is also pivotally connected to arm 245 depending from shaft 246 suitably mounted on the frame. Shaft 246 (Figs. 3, 6 and 8) carries arms 247 and 248 underlying pusher links 196 and 209, respectively. Thus, upon rocking movement of override pawl 108 during the resetting cycle, the above-described linkage operates through arms 247 and 248 to lift pusher links 196 and 209, which results in release of left shift push rod 136 and resetting push rod 213, respectively, causing disengagement of the left shift and resetting drive connections.

Upon release of the return clear key 30, spring 249 (Fig. 3) serves to disengage the clutch, open the motor contacts, and through slide 201 and arm 199, rocks the shaft 156, counter-clockwise as seen in Figs. 3 and 7. Counter-clockwise rotation of shaft 156 causes release of latch 186 by reason of engagement of pin 159 on arm 158 with the extension 191 of the latch, for as shaft 156 and its bellcrank 157 rock counter-clockwise, pin 159 lifts latch 186 from its engagement with pin 185 of bellcrank 180. Upon release of latch 186, bellcrank 180 and therefore shaft 181 are rocked counter-clockwise to an inoperative position (Fig. 7) under the influence of spring 250 attached to arm 251 (Figs. 3 and 5) which is secured on shaft 181.

VII. Multiplication mechanism

The multiplication mechanism of this invention comprises means for performing predetermined plural order multiplying operations in which the respective multiplicand and multiplier figures are entered into the machine by respective keyboards. The respective keyboards with their associated mechanisms control the operation of the machine to perform a multiplication in accordance with the depression of the positive or negative multiplication keys to determine the sign character of the registration of the product in the accumulator. As is usual in this type of machine, the multiplicand keyboard comprises the conventional keyboard of the calculator which is used in other operations, while the multiplier keyboard is preferably of the so-called "ten-key" type which may be operated to set up successively the various digits of the multiplier. It will be understood that the term "ten-key" as used is intended to differentiate from the usual ninety-key type employed for the multiplicand, although the latter type can be employed with other parts of the mechanism if desired. For the purpose of the instant description, the multiplier keyboard and selection mechanism which serves to set the multiplier figure into the machine, will be briefly described, and thereafter the operation controlling mechanism by means of which the multiplicand is entered in the accumulator a number of times corresponding to the respective ordinal values of the multiplier. Only that part of the selection mechanism pertinent to the present invention will be described in full. For a more complete disclosure of the mechanism reference is to be had to the aforementioned Patent No. 2,371,752.

VIII. Multiplier keyboard

The selection mechanism for the multiplier figure is of the type disclosed in said Patent No. 2,371,752. Generally, such mechanism comprises a ten-key keyboard including keys 34 (Fig. 1) and a pin carriage 256 (Fig. 9) associated therewith having ten ordinal rows of settable stop pins 257 and ten ordinal differentially adjustable elements 258 in the form of racks in which digits of the multiplier may be set successively for subsequent control of the multiplying operation. In order to set up the multiplier digits, each pin row includes eight pins corresponding to the "1" to "8" keys and a fixed stop corresponding to the "9" key, so that a depressed multiplier key operates through an associated selection lever 259 to set the corresponding pin of an aligned ordinal row to active, or raised, position. At the same time that a pin of the pin carriage is moved to active position, the aligned rack is released to move into engagement with the pin and thereby be set differentially in accordance with the value of the depressed key. Subsequently the depressed key operates an escapement mechanism to move the pin carriage one ordinal step to the left with respect to the keyboard selection mechanism. As seen most clearly in Figs. 8 and 12, each multiplier key 34 and "0" key 34a is slidably mounted in upper and lower keyboard plates 260 and 261. Upon depression, each key 34 and the "0" key 34a operate the multiplier escapement mechanism which is referred to hereinafter, while the keys "1" to "8" are arranged in a conventional manner for cooperation with a row of selection levers 259 for setting the pin carriage mechanism. There is no selection lever for cooperation with the "9" multiplier key 34 since the "9" setting of the differentially adjustable racks is effected by means of a fixed stop rather than a settable pin stop as occurs with the "1" to "8" multiplier keys.

A selection lever 259 (Figs. 9 and 10) is provided for multiplier keys 34 from "1" to "8," respectively, so that upon depression of a key 34 the corresponding lever 259 will be rocked upwardly to project the nose thereof to active pin-setting position, as seen in Fig. 10. In the pin carriage, eight pins are provided in each ordinal row for the keys "1" to "8," while a stop bar is provided corresponding to the "9" key. The only function of the depression of the "9" multiplier key is to operate the escapement mechanism and to release the aligned rack in the pin carriage.

IX. Multiplier carriage

As explained above, the shiftable pin carriage which controls the multiplying operation carries the ordinal rows of settable pins by means of which the multiplier digits are set into the machine, as well as the differentially settable racks which are adjusted in accordance with the setting of the active pins and consequently the value of the multiplier digits. The machine illustrated has ten orders of pin rows and racks to provide for entry of a corresponding number of multiplier digits. When adjusted, the racks serve to display the selected multiplier value and thereafter are returned successively in step-by-step fashion to their initial position, and during such return, control the operation of the mechanism in accordance with the successive multiplier digits.

The pin carriage frame comprises spaced-apart similar side plates 262 (Fig. 9) and respective upper and lower pin-holding plates 263 and 264 extending between the lower ends of side plates 262, both plates having suitable end projections engaging corresponding slots in plates 262. The frame assembly is held together by a plurality of tie rods having screws 265 threaded into the reduced ends thereof. The pin carriage is slidably mounted in the machine on rods 266 and 267 (Fig. 9). The upper holding plate 263 has a forwardly extended portion 268 to which escapement rack bar 269 is secured by means of screws 270. Rack bar 269 is provided at its edge with teeth 271 (Figs. 9 and 12) for cooperation with a step-by-step escapement mechanism as will be described.

Referring to Figs. 9 and 10, pin plates 263 and 264 of the pin carriage are provided with a series of rows of aligned slots to receive pins 257 for limited endwise sliding movement as determined by the shoulders 275 of a channel formed in the lower portion thereof. The upper shoulder 275 formed by the channel engages the top surface of the lower pin plate 264 in the lowered inactive position of a pin 257, while the lower shoulder 275 engages the lower surface of a pin restore plate 276 to limit the upward movement of the pin 257 in the active position thereof. Pin restore plate 276 is provided with a similar series of rows of aligned slots corresponding with the slots in the pin plate 264 and is normally operatively positioned relative to plate 264 to restore all active pins 257 to their inactive position in a manner later described. The upper ends of the pins 257 are of varying length to allow free movement of the associated settable rack past pins which are in their lower inactive position.

In order to latch a pin 257 in raised position, each pin is provided with latching notch 277 for cooperation with V-shaped end portion 278 of a slotted U-shaped spring plate 279 which is compressed between adjacent pins 257 of a row and is held in place between side plates 262. A spring plate 279 is provided to cooperate with each transverse series of pins in the respective rows. The slots in the lower plate 264 are shorter in length than the width of the upper portion of the pins 257, while the lower end of the pins is sufficiently narrower to enable passage thereof through the slots. In assembling the pins 257 in pin plates 263 and 264, the lower ends of the pins 257 are placed through the lower plate 264 to a position where the upper shoulders 275 engage the top surface of the plate. The upper plate 263 is then pressed down over the ends of the pins until suitable slots therein engage with corresponding locating projections on the upturned ends of the lower plate 264. The slots in the restore plate 276 correspond in length to those slots of plate 264, thereby permitting the passage of the lower ends of the pins 257. The restore plate 276 is then moved rearward to lock the pins 257 in position for upward and downward sliding movement, as seen in Fig. 10. The pin box unit thus formed is then locked in position between the carriage side plates 262.

Referring to Fig. 9, an ordinal row of pins 257 is provided for each differentially settable rack segment 258, which rack is normally held in its "0" position and which can be released to assume a differential adjustment in accordance with the pin of the associated row which is moved to active position by depression of a selected multiplier key. For this purpose rack segments 258 are pivotally mounted in a conventional manner on transverse shaft 282 journalled in the side plates 262 and are normally urged in a clockwise direction, as viewed in Fig. 9, under the urgency of a spring not shown. Each segment 258 is provided with a stop end 283 which normally engages the upper end of holding pawl 284. The series of pawls 284, one for each rack segment 258, are pivoted on one of the spacer shafts extending between plates 262 and have their ends projecting through aligned slots in upper and lower pin plates 263 and 264. Each pawl 284 is urged in a counter-clockwise direction, as viewed in Fig. 9, by a spring 285 to a position determined by the engagement of a shoulder 286 thereon with the lower surface of the upper pin plate 263. Each spring 285 is connected at its one end to a stud 287 on the lower end of each associated holding pawl 284, and at its other end in an ear formed at right angles to each latch arm 288, which latch arms are pivotally mounted on a transverse shaft 289 supported at its ends in plates 262. Mounted adjacent holding pawls 284, each latch arm 288 is provided with a notch 290 in the free end thereof, which, upon clockwise rocking of holding pawl 284, is urged by spring 285 into operative engagement with stud 287 of the associated holding pawl. Thus pawl 284 is held in its inoperative position for the duration of the multiplying operation.

Each adjustable element 258 is provided with an indicating sector, or dial, 35 (Figs. 1 and 9) having numerals from "0" to "9," one of which becomes visible through sight opening 292 in case 15 to display the value of a multiplier digit set into the machine in accordance with the adjusted position of the element. For the values "1" to "8," such adjusted position is controlled by the active pin 257, while for the "9" position the leading edge of the spoke 293 of the adjustable element is adapted, when released, to engage a transverse bar 294 supported at its ends in the free ends of similar arms 295. Each of arms 295 is an integral part of similar segmental gears 296 which are secured on opposite ends of transverse shaft 282 for rocking movement in a carriage plate 262.

Conventional means is provided for releasing rack segments 258 of the active order of the pin carriage 256 simultaneously with the movement of a pin 257 to active position. Pawl 284 for releasing a rack segment 258, is moved to inactive position by means of an arm (not shown), the nose 297 of which (Fig. 9) is operatively related to the lower end of the aligned holding pawl 284. Upon depression of any multiplier key 34, the corresponding selection lever 259 becomes active to project a pin 257 into active position in accordance with the value of the key depressed, and the nose 297 is simultaneously moved to the left to rock the aligned pawl 284 to its inactive position, thereby releasing the associated rack segment 258. As is well-known, however, depression of the "0" key 34a serves only to escape the pin carriage one step to the left and nose 291 is inoperative to release a pawl 284. Upon movement of pawl 284 to its inactive position, spring 285 becomes active to rock the notch 290 of the adjacent latch arm 288 into engagement with the stud 287 of the pawl. For a complete description of the pin-setting and pawl-releasing mechanism, reference is to be had to the aforementioned Patent No. 2,371,752.

X. *Multiplier carriage escapement mechanism*

As previously explained, the pin carriage is movable step-by-step transversely of the machine in accordance with the number of multiplier digits entered. The pin carriage is normally in its right-end position, as viewed from the front of the machine, with indicating sectors 35 to the right of, and not visible through, sight opening 292. The condition shown in Fig. 1 would obtain, after three successive depressions of "0" key 34a, to move the pin carriage to its left when three sectors 35 are in value displaying position. The pin carriage is spring-urged toward its left-end position in a well-known manner by means of horizontally disposed bellcrank 300 (Fig. 24) which is pivoted at 301 on the machine base by means of an adjustable eccentric and has an upstanding arm 302 engaging right side plate 262 of the pin carriage. Another arm of bellcrank 300 has spring 303 secured thereto, whereby the bellcrank is urged in a counter-clockwise direction, as viewed in Fig. 24, and correspondingly the pin carriage is urged from its right-end position which it occupies when no multiplier value is set in the machine.

Normally, the movement of the pin carriage, under the influence of spring-urged bellcrank 300, is prevented by means of stop pawl 304 (Fig. 12) pivoted at 305 on an upstanding ear of lower keyboard plate 261. Spring 306, tensioned between a depending arm of pawl 304 and pawl arm 307 pivoted at 308 on an upstanding ear of lower keyboard plate 261, serves to urge pawl 307 to its inactive position and the nose of pawl 304 to its active position in engagement with a tooth 271 of the carriage escapement rack 269 previously described. Pawl arm 307 is slotted longitudinally to receive pin 309 carried by arm 310 on rod 311 journalled in spaced ears of lower keyboard plate 261. Pawl arm 307 also carries laterally projecting tooth 312 which is normally positioned immediately above teeth 271, as shown in Fig. 12, and is disposed for downward movement between the pair of teeth adjacent, and (in Fig. 12) to the right of, that contacted by stop pawl 304. A nose 313 is also carried by pawl arm 307 and overlies pin 314 of stop pawl 304 for control thereof.

Preferably, the escapement shift is performed in two stages; one stages occurring during depression of a multiplier key and the last stage occurring just before return of the key to raised position. When a multiplier key is depressed, shaft 311 is rocked in a manner disclosed in the aforementioned Patent No. 2,371,752, whereby arm 310 (Fig. 12) and pin 309 serve to rock pawl arm 307 about its pivot, in a clockwise direction in Fig. 12, thereby simultaneously lowering the tooth 312 of pawl arm 307 from the position shown in Fig. 12 to overlap the adjacent rack tooth 271. During continued movement of pawl 307, its nose 313 engages pin 314 and rocks stop pawl 304 to disengage its nose from the associated tooth 271. As soon as the nose of the pawl 304 is disengaged from a tooth 271, the first stage of the shift step occurs and the pin carriage moves to the right, as viewed in Fig. 12, under the influence of the spring pressure thereon until a rack tooth 271 engages tooth 312 of arm 307.

The movement of the pin carriage during this stage of a shift step corresponds to the space between the tooth 312 and the rack tooth 271 adjacent thereto. This movement serves to move the active tooth 271 over the nose of pawl 304 but is insufficient to allow engagement of the projected selection lever 259 (Figs. 9 and 10) with the next pin row. Subsequently, as the depressed multiplier key is released, the parts start their return from depressed position. Pawl 304, however, is held depressed by the associated tooth 271 and cannot return upwardly with the other parts until the inclined face of tooth 312 has permitted shifting of the pin carriage for an amount to move the associated tooth 271 from over the nose of pawl 304, so that the pawl 304 will work upwardly into engagement with the next tooth 271 to the left (Fig. 12) of the tooth with which it was engaged before depression of the multiplier key. Shortly before the depressed key is restored to its upper position, the one step shift is completed, whereby all of the pin setting and escapement shift parts will also be restored to normal position and the carriage will be conditioned for a subsequent shifting movement.

From the foregoing description it will be seen that each time a multiplier key is depressed, the aligned rack segment and selected pin of the pin carriage are set, while at the same time the carriage has escaped one step toward the left (as viewed from the front of the machine) to display the set figure through the multiplier sight opening. This operation is repeated as the various digits of the multipler are set into the machine. If a mistake is made in setting the multiplier digit, such mistake can be corrected by resetting the multiplier racks as will be described hereinafter.

The operating mechanism for the racks 258 is conventional and comprises feed pawl 318 (Fig. 13) which, with the pin carriage in its right-hand position, as viewed from the front of the machine, is located one ordinal step to the left thereof. As each rack is adjusted by depression of a multiplier key 34 or "0" key 34a, and the pin carriage escapes one step to the left, the adjusted rack moves into alignment with the actuating pawl 318. Thus, after the complete multiplier is set into the machine, the last adjusted rack 258 corresponding to the lowest digit of the multiplier will always be aligned with pawl 318 at the end of the multiplier setting operation.

Pawl 318 (Fig. 13) is pivotally secured at 319 to the end of arm 320 suitably pivoted on frame plate 321. Pawl 318 is urged in a counter-clockwise direction, as viewed in Fig. 13, by spring 322 tensioned between a pin connecting arm 320 to pitman 327 and a lug 323 of pawl 318. Lug 323 is spaced from arm 320 in the inactive position of pawl 318 and engages arm 320 to limit the rocking movement of the pawl upon movement to active position. Pawl 318 is held in inactive position by its upward extension 324 engaging behind holding pawl 325 which is secured at the end of shaft 326 suitably journalled in the framework of the machine. Pawl 318 is held in the position shown in Fig. 13 until depression of a multiplication operation key so that both feed pawl 318 and holding pawl 325 are maintained inactive until the multiplying operation is begun.

In order to actuate pawl 318, arm 320 is pivotally connected to pitman 327 which engages an eccentric cam (not shown) secured on shaft 62 between similar disks 328. Pitman 327, arm 320, and pawl 318 are reciprocated once for each cycle, or rotation, of shaft 62. The operation of the pawl 318 in its active direction occurs at the beginning of each cycle. However, the pawl 318 is held in inactive position until holding pawl 325 is allowed to move in a counter-clockwise direction from the position shown in Fig. 13 by oscillation of shaft 326. Upon operation of pawl 318, each rack 258 is successively restored step-by-step to its "0" position and operates in the last step of movement to provide for the shift cycle at the end of each ordinal multiplication.

It will be recalled that in setting up the multiplier value, each holding pawl 284 (Fig. 9) is rocked clockwise to release the associated rack segment 258 and is maintained in this rocked position by the engagement of the latch arm 288 with the stud 287. The last step movement of the active rack to its normal position controls and determines shifting of the accumulator and the pin carriage to align the next higher order rack 258 with the pawl 318, as described in said patents. Upon alignment of the next higher order rack 258 with the feed pawl 318, the previously active rack is released due to the disablement of the holding pawl 284. To enable an ordinal right shift of the pin carriage, feed pawl 318 is restored to its inoperative position following the last step movement of the active rack segment 258, whereupon the segment is released to the adjusted position initially determined by the associated active pin 257 or transverse bar 294.

XI. *Pin carriage shifting means*

As seen in Figs. 9 and 13, the pin carriage is provided with a shift rack 332 secured on the framework of the carriage. Rack 332 is adapted for operation by an operating pawl 333 carried by an eccentric portion of collar 334 which is slidably and non-rotatably mounted on shaft 178 for cyclic control thereof. Arm 335 is mounted for rocking movement on shaft 336 and carries pin 337 engaging in an annular groove of collar 334 normally positioning pawl 333 below rack 332 as seen in Fig. 13. Operation of arm 335 through a jaw clutch on shaft 336 serves to lift the pawl 333 into the plane of rack 332 to effect a one-step shift of the pin carriage during a multiplying operation. The direction of the shift is toward the right as viewed from the front of the machine. Mechanism for controlling the shifting of the pin carriage during a multiplying operation will be described hereinafter.

XII. *Multiplication keys*

The condition of the machine for the multiplying operation as controlled by the multiplication operation keys will now be described. When one of the keys 36, 37 or 38 is depressed and latched in depressed position, several functions of the machine are set into operation selectively in according with the type of operation determined by the key depressed. These functions include enabling of the control which determines the sign character of the registration of the product, enabling of the power set means for operating the sign character control, enabling of the carriage shift mechanism to determine return of the carriage to an end position, selective enabling of the resetting mechanism for the accumulator and the revolutions counter, setting the control for enabling feed pawl 318 for the multiplier racks, engaging the clutch, and enabling the motor circuit. The mechanisms performing these functions and their relation to multiplication keys 36, 37 and 38, will now be described, while the control of the key 39 will be described hereinafter.

Keys 36, 37 and 38 (Figs. 1, 8, 14 and 15) are mounted for endwise sliding movement in respective keyboard plates 260 and 261, and are urged to raised position by similar springs 340 disposed in the slotted key pins and compressed between the key and lower plate 261. The raised position of the respective keys is determined by the respective latch arms 341 engaging the under surface of upper plate 260. At their outer end, latch arms 341 of keys 36 and 37 are provided with latching teeth for engagement with a single latching tooth 342 on latch lever 343 (Fig. 14), while the latch arms 341 of keys 38 and 39 have respective latching teeth for engagement with a single latching tooth 344 on latch lever 345 (Fig. 8). Each of latch levers 343 and 345 are secured on transverse shaft 346 which is suitably journalled in vertical frame plates 347 and 348 of the multiplier unit. Latch levers 343 and 345 are urged, in a clockwise direction in Figs. 8 and 14, by spring 349 suitably tensioned between the frame and the lower end of lever 343. The lower end of lever 343 is also operatively related with arm 350 which is adjustably secured by any means, such as screw 351 (Fig. 24), to lever 300 to form an adjustable bellcrank, whereby the latch for the depressed keys 36, 37, 38 or 39 can be released at the end of an operation, as later described. Suitable interlocking means may be provided for preventing simultaneous depression of keys 36 and 37, or 38 and 39.

XIII. *Registration sign character control*

Means are provided which are normally conditioned to effect a positive sign character registration of the product in the accumulator when keys 36 or 38 are depressed, and is positionable to effect a negative registration upon depression of key 37, such means being subsequently operated by power means also enabled by depression of selected key. Respective keys 36 and 37 carry pins 356 and 357 (Fig. 15) extending through the adjacent frame plate 347 with the pin 357 engaging in a slot at the forward end of a bellcrank lever 360 pivoted at 361 on frame plate 347. Bellcrank lever 360 carries an upstanding arm 362 having a link 363 pivoted thereto and offset laterally intermediate its ends to extend beyond the adjacent frame plate 347. At its rearward end link 363 is pivoted on depending arm 364 intermediate the ends thereof, which arm is pivotally mounted on a transverse shaft 365 suitably journalled between frame plates 321 and 347. The lower end of arm 364 is pivotally connected to one end of a link 366, the other end of which extends rearwardly and is pivoted at 367 to the upper end of an inserted L-shaped link 368. The lower rearwardly extended end of link 368 is pivoted at 369 to one end of a cam follower 370 mounted for oscillatory motion on a stud 371 on frame plate 347. The oscillation of lever 370 is controlled by a roller 372 thereon which is urged by a spring 373 to follow a cam 374 rotatably mounted on drive shaft 62 and driven by means to be hereinafter described.

Adjacent the pivotal connection 367 the upwardly extended portion of link 368 is distended sufficiently to accommodate studs 375 and 376 disposed on opposite sides thereof. Stud 375 normally underlies an ear 377 formed at right angles to positive setting arm 378 to control the clockwise rocking movement thereof about a pin 379 (Figs. 15, 16 and 17) secured on power-actuating plate 380. At its rearward upwardly extended end, positive setting arm 378 is provided with an arcuate slot 385 for engagement with a pin 386 on the upper end of a lever 387 secured to the end of transverse shaft 78, whose rocking movement, as previously described, moves gate 76 to control the engagement of the plus-minus gears with the numeral wheel gears and therefore controls the sign character of the registration. A spring 388 normally urges the lower end of a depending arm 389 of setting arm 378 into abutting relation with a shaft 390 secured at its ends in the framework of the machine, whereby slotted end 385 is maintained below pin 386 but can be moved into engagement therewith upon initiation of a multiplying operation as determined by a depression of keys 36 or 38.

Key 37 serves to condition the multiplying mechanism for a negative registration of the product in the accumulator for upon depression thereof, it rocks bellcrank 360 to move link 363 and hence link 366 forwardly, so that stud 376 (Figs. 15 and 16) is moved forwardly from the position shown to a position underlying a laterally extended ear 391 of negative setting arm 392. Arm 392 is also mounted for rocking movement on pin 379 of power-actuating plate 380 and is spaced apart from arm 378 sufficiently to permit rocking movement of link 368 about its pivot 369 between the inner edges of respective ears 391 and 377. The downwardly extended offset end 393 of negative setting arm 392 is provided with an arcuate slot 394, similar to slot 385, for engagement with a pin 395 in the lower end of lever 387. A spring 396 normally urges the slotted end 394 to an inoperative position relative to pin 395, which position is determined by the abutment of an extended ear 397 of depending portion 393 with shaft 390.

Thus, it will be noted that upon depression of a key 36 or 38 and the subsequent rotation of cam 374 (Fig. 15), lever 370 is rocked, clockwise in this figure, to move link 368 upwardly, whereupon stud 375 engages ear 377 to rock positive setting arm 378 clockwise to engage its notched end 385 with pin 386. Similarly, if negative multiplication key 37 is depressed, bellcrank lever 360 is rocked clockwise to move links 363 and 366 forwardly of the machine, whereupon link 368 is rocked clockwise to position stud 376 beneath ear 391 of negative setting arm 392. The counter-clockwise rotation of cam 374 then operates through lever 370 to move link 368 upwardly, thereby rocking negative setting arm 392 clockwise to engage its notched end 394 with the pin 395. Immediately following the engagement of the slotted end of arm 378 or the slotted end of arm 392 with the respective pins 386 and 395, lever 387 and therefore shaft 78 are rocked, respectively counter-clockwise or clockwise, by the rearward, or leftward, movement of power-actuating member 380 (Fig. 17) to mesh the plus or minus gears with the numeral wheel gears. Power-actuating member 380 is suitably mounted for reciprocatory movement on frame plate member 321 by similar pin-and-slot connections 398 and carries rollers 399 and 400 diametrically opposed relative to the axis of shaft 62 for the control of member 380 by a cam 401 rotatably mounted on shaft 62 and driven by clutch means to be hereinafter described.

XIV. *Carriage return and resetting control*

Upon depression either of multiplication operation keys 36 or 37, means are brought into play to first determine shifting of the carriage to its left-end position as a preliminary to the multiplying operation. Where a resetting operation is desired, key 38 is operated and a return and resetting operation may be performed to selectively zeroize the accumulator, the counter, or both, in accordance with the adjustment of the resetting knobs 28, 29 (Fig. 1).

Key 38 (Fig. 8) overlies a roller 405 on the lower end of an arm 406 of bail 407 pivotally mounted on shaft 408 secured in frame members 347 and 348. A right angle extension 409 at the forward end of a rearwardly extended arm 410 (Fig. 15) is formed to straddle frame plate member 347 and is secured by any suitable means, such as screw 411, to bail 407 for rocking movement therewith. The rearward end of arm 410 overlies a roller 412 on the forward end of a horizontally disposed arm of a bellcrank 359 to control the rocking movement thereof. Bellcrank 359 is pivoted at 361 on frame plate member 347 and has a depending arm 413 (Fig. 18), the rearward edge of which abuts a stud 414 on a distended portion of an upstanding arm 415 pivotally mounted in an annular groove of the hub of an arm 416 secured on shaft 156 to permit independent rocking movement of the arm 416. Arm 415 carries a laterally extended ear 417 engaging the nose 418 of arm 416 to control the rocking of shaft 156 upon depression of a multiplication control key. Arm 415 and bellcrank 359 are normally maintained in the inoperative position shown in Figs. 15 and 18 under the urgency of a spring 419 which is secured at its one end to a stud 420 on arm 415 and at its other end to a stud on the frame plate 347. Similarly, the inoperative position of shaft 156 and therefore arm 416 (Fig. 18) is determined by the engagement of nose 418 with the inner face of the ear 417 under the urgency of spring 249 (Fig. 3).

Depression of key 38 therefore serves to rock arm 406 and hence arm 410, clockwise in Fig. 8 or counter-clockwise in Fig. 15, to impart a clockwise rocking movement to bellcrank 359, which, through stud 414 (Fig. 18) imparts a counter-clockwise rotation to arm 415. Such rotation of arm 415 is effective, through ear 417 and nose 418 of arm 416, to rock shaft 156, counter-clockwise as viewed in Figs. 6 and 18 and clockwise in Fig. 7. It will be recalled that rotation of shaft 156 (clockwise in Fig. 7) rocks hook 176 to a position where the rotation of eccentric 169 causes the engagement of hook 176 with stud 183 to rock bellcrank 180 and shaft 181, clockwise in this figure. Hence, arm 195 secured on shaft 181 moves pusher link 196 rearwardly (Fig. 5) to control the rearward movement of left shift push rod 136, thereby engaging the left shift clutch 123, 124. Such rocking of shaft 181 (clockwise in Fig. 8) also serves through arm 208 to move pusher link 209 and resetting push rod 213 rearwardly to effect an operation of the zero resetting mechanism.

The oscillation of shaft 156 also operates through arm 199 and pin 200 (Fig. 3) to move slide 201 rearwardly, thereby engaging the clutch and closing the motor circuit.

Each of keys 36 and 37 operate in a similar manner to control a left shift of the accumulator to its extreme end position. However, means are provided for preventing operation of the zero resetting mechanism upon depression of either of these keys. For this purpose a bellcrank 424 is pivotally mounted at 361 (Fig. 15) on frame plate 347. The bellcrank has a substantially horizontally disposed arm 425 with an inverted U-shaped end portion at the open end of which ears 426 and 427 extend laterally to a position underlying pins 356 and 357 of respective keys 36 and 37. Bellcrank 424 carries a depending arm 428 (Figs. 15 and 18) lying in the same plane with arm 413 of bellcrank 359 and having its rearward edge abutting stud 414 similarly to that of arm 413. Intermediate its length, arm 428 carries a lateral projection 429, the bifurcated end of which is angularly disposed to the plane of the arm 429 to form a camming engagement with a pin 430 on an arm 431 secured to shaft 434. A delay is provided between roller 357 and ear 427 to compensate for the difference in radii from the axis of the pivot 361 to rollers 356 and 357, thereby permitting a comparable angular rotation of bellcrank 424, irrespective of which key 36 or 37 is depressed. Clockwise rocking of bellcrank 424 by either of keys 36 or 37 serves through pin 414 (Fig. 18) to rock arm 415 and therefore shaft 156 counter-clockwise, and through arm 429 and pin 430 to impart a counter-clockwise rotation to arm 431 and shaft 434 journalled in frame plate members 347 and 348 (Fig. 8). An arm 435 is secured to the opposite end of shaft 434 (Fig. 8) and carries a pin 436 abutting a depending arm 437 of pusher link 209. Rotation of shaft 434, clockwise in Fig. 8, therefore, is effective through stud 436 to impart counter-clockwise rotation to pusher link 209, thereby disengaging its notched end 212 from resetting push rod 213. Simultaneously, clockwise rocking of bellcrank 424 (Figs. 15 and 18) operates through arm 428 and pin 414 to rock arm 415 and therefore shaft 156 counter-clockwise. As described previously, rocking of the shaft 156 serves to engage the clutch and close the motor circuits, and through hook 176 (Fig. 7) causes a clockwise rotation of bellcrank 180, which serves through shaft 181 to move left shift push rod 136 rearwardly to effect an engagement of the left shift clutch. Likewise, rocking of shaft 181 causes a rearward movement of the resetting pusher arm 209 rearwardly (Fig. 8), which is ineffective to engage the resetting clutch since pin 436 on arm 435 rocks pusher arm 209 out of engagement with the pusher rod 213.

Partial depression of key 37 is effective through roller 357 to rock bellcrank 360 (clockwise as viewed in Fig. 15) to move link 363 and 366 forwardly of the machine, thereby positioning stud 376 into operative relation with ear 391 (Fig. 16) of negative setting arm 392. Further depression of key 37 operates in exactly the same manner as key 36 to rock bellcrank 424 clockwise, thereby disabling resetting pusher arm 209 (Fig. 8) and enabling the left shift clutch to effect a shifting operation of the accumulator to an endmost position.

It will be recalled that other control keys, such as return and clear key 30, function also to impart counter-clockwise rotation to shaft 156 (Fig. 18). Means must therefore be provided to prevent depression of multiplier control keys 36, 37 or 38 during an operation initiated by such keys. As described supra, arm 415 is pivotally mounted adjacent arm 416 on the hub thereof, arm 416 being secured to shaft 156 so that shaft 156 and arm 416 may be rotated independently of arm 415, which is held in an inactive position by spring 419. Means become operative with the independent oscillation of arm 416 to prevent counter-clockwise rotation of bellcranks 359 and 424. For this purpose arm 416 carries a bellcrank 442 pivoted thereon at 443 and having a ledge 444 extending forwardly of, and at right angles to, an arm of bellcrank 442. A vertical arm 445 of bellcrank 442 is provided with a longitudinal slot 446 embracing a roller 447 on arm 415. Upon counter-clockwise movement of arm 415 with a depression of keys 36, 37, or 38, arm 416 and therefore bellcrank 442 are similarly rocked to move the leading edge of the ledge 444 to a position immediately underlying an extended end 448 or 449 of the respectively rocked arm 413 or 428. However, when shaft 156 rocks arm 416 independently of arm 415, such as with a depression of a control key other than the multiplication control keys, roller 447 in co-operation with slot 446 serves to move ledge 444 of bellcrank 442 into blocking relation with the extended ends 448, 449 of respective arms 413, 428 of bellcranks 359 and 424.

Upon clockwise rocking of bellcrank 359 and 424 means are provided to condition the machine for the multiplication operation proper, following shifting of the carriage to its left-end position. For this purpose, a link 454 (Figs. 18 and 19) is pivoted at its one end at 455 to arm 415 for movement therewith, and at its other end is pivoted at 456 to a depending actuating link 457, the lower end of which is pivoted on the free end of an arm 458 secured on one end of a shaft 459. Actuating link 457 is provided with a shoulder 460 (Fig. 18) which is operative to be moved with the counter-clockwise rocking of arm 415 to an operative position with respect to a square stud 461 on the forward end of a multiplication control lever 462 pivoted at 463 on frame plate 347. Thus it can be seen that upon depression of a multiplication key 36, 37 or 38, when arm 415 is rocked, counter-clockwise as viewed in Fig. 18, link 454 and the upper end of link 457 is moved to the left to position the shoulder 460 immediately above the square stud 461, whereupon subsequent counter-clockwise rocking movement of shaft 459 and arm 458 serves to rock control lever 462 clockwise about its pivot 463. Link 457, arm 458 and therefore shaft 459 are normally urged to the inoperative position shown by a spring 464 secured at its one end to a stud on arm 458 and at its other end to a stud on frame plate 347.

From the above it is seen that a depression of key 38 starts the operation with carriage shifting and in the left-end position thereof, initiates a resetting operation, whereas keys 36 or 37 effect a left carriage shift but the resetting mechanism is inactive so that the amount entered is cumulative to the amounts in the accumulator and counter. The initiation of a multiplication operation proper is effected during the overstroke cycle with the carriage in its left-end position when override pawl 108 (Fig. 4) operates through slide 242, bellcrank 243 (Fig. 3), link 244, arm 245 and shaft 246 to rock arm 247, lifting pusher link 196 out of engagement with the pin 145 (Fig. 6), thereby disabling the shift connection to the left shift mechanism. Simultaneously, rocking of shaft 246 operates in a well-known manner through arm 248 (Fig. 8) to disengage pusher link 209 from resetting push rod 213 when key 38 has been depressed, and, in all instances to impart counter-clockwise rotation to bell crank 468 about its pivot on shaft 181, whereupon pin 469 on the lower end of an arm of bellcrank 468 engaging in a notch of link 470 rocks arm 471 and therefore shaft 459, clockwise as viewed in Fig. 8 and counter-clockwise in Fig. 18, the notch in link 470 being normally maintained in engagement with pin 469 by any conventional means such as spring 472.

Referring to Figs. 15 and 18, arm 458 then becomes operative, upon rocking of shaft 459, to move link 457 and the forward end of control lever 462 downwardly. Lever 462 is maintained in the clockwise rocked position thereof for the duration of the multiplication operation by means now to be described. A bellcrank 475 having a vertical arm 476 is pivotally secured at 477 on frame plate 347. At its upper end, arm 476 is provided with a shoulder 478 for engagement with an ear 479 formed at right angles to the forward end of control lever 462. The nose of arm 476 normally abuts the inner surface of ear 479 under the urgency of a spring 480 secured to a stud on the forward end of the horizontal arm of bellcrank 475 and to a stud on frame plate 347, which spring serves to move the ear 478 into latching engagement with ear 479 upon clockwise rocking movement of lever 462.

XV. Multiplier feed enabling mechanism

Following the initial return of the carriage to its left end position, the feed pawl for the racks of the pin carriage is also enabled. To enable the feed pawl 318 (Fig. 13) by release of the holding pawl 325, shaft 326 upon which holding pawl 325 is mounted, carries arm 484 (Fig. 15) having pin 485 engaging the slotted end of link 486 pivotally connected at 487 to the rearward end of lever 462 for movement therewith. Pin 485 is also engaged by spring 488 which constantly urges arm 484 and shaft 326 to move the holding pawl 325 to its operative position (clockwise in Fig. 15 or in a counter-clockwise direction as viewed in Fig. 13). Therefore, upon clockwise rotation of multiplication control lever 462, arm 484 and the holding pawl 325 are also released to allow the feed pawl 318 to move into engagement with the aligned rack 258.

XVI. Multiplication control mechanism

Subsequent to the initial carriage return or carriage return and resetting operation, the rocking of lever 462 serves not only to enable feed pawl 318 (Fig. 13), but also to enable power means for controlling the engagement of positive setting arm 378 with pin 386 or negative setting arm 392 with pin 395, and the setting of the plus-minus gears for a positive or negative registration of the product in the accumulator. For this purpose, a bellcrank 492 is secured to shaft 493 (Fig. 15) and has a horizontal arm 494, the slotted end of which embraces pin 487 of lever 462. Shaft 493 is suitably journalled in the framework of the machine and, intermediate its ends, carries an upstanding arm 495 secured thereto. The arm 495 has an extended portion 496 near the upper end thereof, which is provided with an ear 497 formed at right angles thereto underlying the nose 498 of a clutch-engaging lever 499 of a clutch shown generally at 500 (Figs. 15, 20 and 22). Clutch 500 comprises a driving ratchet 501 secured on drive shaft 62 (Fig. 22) and having two teeth 507 and 644 operatively spaced at 90 degrees, one from the other, and a driven element comprising spring-urged engaging lever 499 pivoted at 502 on a disk 503 journalled on shaft 62. Disk 503 and its lever 499 are maintained in an operative plane with two-toothed ratchet 501 by any suitable means, such as a collar 508 secured to shaft 62 (Fig. 20) and lying immediately adjacent the left side of the clutch assembly (Fig. 23). Angular rotation of disk 503 is therefore determined by the engagement or disengagement of the lever 499 with either of the teeth of ratchet wheel 501, as will be described hereinafter. Normally, ear 497 of arm 495 serves to maintain lever 499 disengaged from two-toothed ratchet 501, as arm 495 is rocked to blocking position by the urgency of a relatively strong spring 504 (Fig. 15) secured at its one end to a stud on frame plate 347 and at its other end to a link 505 pivoted at 506 to the upper end of a vertical arm of bellcrank 492. It can be seen, therefore, that upon clockwise movement of lever 462, bellcrank 492 and therefore arm 495 are rocked, counter-clockwise as viewed in Fig. 15, to enable the spring-urged engagement of the tooth of pawl 499 with the tooth 507 of the ratchet wheel 501.

As previously explained, with link 368 in the normal position shown in Figs. 15 and 16, and upon depression of keys 36 or 38, cam 374 serves to rock lever 370 clockwise and, through pin 375 and ear 377, imparts a clockwise rotation to positive setting arm 378, thereby engaging its notched end 385 with pin 386. Similarly, upon depression of negative multiply key 37, pin 376 on link 368 is moved to the right where it underlies ear 391 of negative setting arm 392, whereupon the counterclockwise rotation of cam 374 (Figs. 15 and 20) serves to move the slotted end 394 of negative setting arm 392 into engagement with the pin 395 of gate control lever 387. Cam 374 is secured to driven disk 503 by means to be later described, so that rotation of the cam is under the control of the clutch 500.

Lever 462 and therefore arm 495 (Fig. 15) are operatively rocked in the first 180 degrees of the overstroke cycle following return of the carriage to its left-end position, thereby releasing pawl 499 to the urgency of its spring (Fig. 22). However, clutch 500 is not engaged until after 240 degrees rotation of shaft 62 during the overstroke cycle, when tooth 507 of ratchet wheel 501 engages the tooth of pawl 499 to impart a counter-clockwise rotation to cam 374 (Figs. 15 and 20, thereby conditioning either arm 378 or 392 for control of the plus-minus gate setting lever 387 in accordance with the type of multiplication operation desired. Clutch 500 remains in engagement for 270 degrees rotation, i.e., the remaining 120 degrees of the overstroke cycle and the first 150 degrees of the first machine cycle of the multiplication operation proper. Following this 270 degree rotation of the clutch 500 and therefore cam 374, means are brought into play to disengage the clutch, as will now be described.

A bellcrank 510 is pivotally mounted on a stud 511 secured on the inner side of frame plate 347 and has a horizontally disposed arm 512 (Fig. 20) which is provided at its end with an ear 513 formed at right angles thereto. Ear 513 is normally maintained out of engagement with the peripheral surface of the clutch disk 503 by a depending arm 514 of bellcrank 510, which arm is held in abutting relation with a stud 515 on arm 495 under the urgency of a spring 516 secured at its one end in arm 514 and at its other end to a stud on the upper extremity of arm 495. Thus, it can be seen that upon rocking of arm 495 to effect engagement of the clutch 500, spring 516 serves to urge ear 513 into the plane of the nose 498 of the pawl 499, whereupon clutch 500 is disengaged following 270 degrees rotation thereof, in which position the clutch 500 remains disengaged until the last cycle of the multiplying operation.

Means are provided for preventing backlash or reverse motion of clutch 500 in either disengaged position thereof. For this purpose, a detent wheel 517 (Figs. 20 and 23) is secured to clutch disk 503 by any suitable means, such as pins 576, and is provided with two teeth, or notches, angularly disposed in the periphery thereof for cooperative engagement by the end of a depending arm 518 of a detent pawl 519 pivoted on stud 511. Arm 518 normally rides on the periphery of the detent wheel 517 under the urgency of a spring 520 and in each disengaged position of the clutch 500, moves into engagement with the respectively positioned tooth of the wheel 517.

Rocking of arm 495 to engage clutch 500 also serves to engage a second clutch, shown generally at 522 (Figs. 21 and 23), which clutch is effective to drive cam 401 (counter-clockwise in Figs. 17, 21 and 23), thereby moving power-actuating plate 380 rearwardly through complementary rollers 399, 400. It will be recalled that the rearward movement of plate 380 and therefore pin 379 (Fig. 15) serves to engage the plus-minus gears with the accumulator shaft gears for a positive or negative product registration as determined by the actively positioned setting arm 378 or 392.

Clutch 522 comprises a driving member 523 (Figs. 21 and 23) secured on shaft 62 and having notches 524 and 525 diametrically opposed in the periphery thereof, with the driving edge of each extended to effect an engagement of the tooth 526 of a pawl arm 527. Pawl arm 527 is pivotally mounted at 528 on a driven disk 529 rotatably mounted on shaft 62 and lying in the plane of driving member 523. In the full-cycle position shown in Fig. 21, a nose 530 of the pawl 527 is engaged by an ear 531 formed at right angles to a depending arm 532 of a bellcrank lever 533. Thus, tooth 526 of pawl 527 is normally maintained out of engagement with either notch of member 523 against the urgency of a spring 534. Bellcrank lever 533 is pivotally mounted on shaft 365 secured in the framework of the machine, and an arm 535 thereof is provided at its free end with an ear 536 (Figs. 13 and 15) overlying stop 537 on pin carriage 256 in the right-hand position of the carriage, or an active rack 258 in any shifted position of the carriage. With the pin carriage in its rightmost position, bellcrank 533 is held against rocking movement by the stop 537, whereas, with a factor set in the pin carriage, the leftward shifting of the pin carriage shifts stop 537 from under ear 536 and bellcrank 533 is controlled by the active rack 258. The bellcrank 533 is then enabled to rock (clockwise in these figures) if a value other than "0" stands in the active rack, and when the active rack returns to its "0" position it rocks bellcrank 533 to control the shifting of the pin carriage and accumulator carriage in a manner to be described.

In the normally inoperative position of arm 495 bellcrank 533 is maintained in its clutch-disengaging position by the engagement of the forward edge of arm 495 with a stud 538 (Figs. 15, 20 and 21) on depending arm 532 of bellcrank 533. Therefore, in the first 180 degrees of the overstroke cycle of the shifting mechanism, when lever 462 (Fig. 15) is rocked to impart a counter-clockwise rotation to arm 495, thereby engaging clutch 500 (Figs. 20 and 21), a spring 539, secured at its ends to studs on arms 495 and 532, serves to urge bellcrank 533 clockwise to engage clutch 522 when a value has been set in the multiplier carriage. However, if no value has been set in the pin carriage, bellcrank 533 is held against rocking movement by the engagement of ear 536 with the stop 537, thereby causing spring 539 to yield upon rocking of arm 495.

To initiate a multiplication operation, i.e., after a value has been set in the pin carriage 256, each of the clutch pawls 499 and 527 of the respective clutches 500 and 522 is released in 180 degrees of the overstroke or resetting cycle. After 240 degrees of the cycle, driving tooth 507 (Fig. 22) of the associated clutch 500 engages pawl 499 to impart a 30 degree rotation of cam 374 when the previously determined setting arm 378 or 392 is conditioned for control of gate-setting lever 387. At this time, that is, after 270 degrees of the same cycle, notch 525 of driving member 523 (Fig. 21) engages tooth 526 of pawl 527 to drive cam 401 secured to disk 529 in a counter-clockwise direction (Fig. 17). The remaining 90 degrees of the overstroke cycle is then effective through clutch 522, cam 401, plate 380 and arm 378 or 392, to adjust the plus-minus gears for a positive or negative registration in the accumulator. Simultaneously with the setting of the plus-minus gears, clutch 522 is disengaged by means now to be described, whereas clutch 500 is driven 270 degrees, or 150 degrees of the first ensuing multiplication cycle, whereupon nose 498 (Fig. 20) engages ear 513 to cause disengagement of the clutch. Detent pawl 519 then becomes effective to prevent rebound of the clutch in this position.

Following a 90 degree rotation, clutch 522 is disengaged when the nose 530 of pawl 527 (Fig. 21) engages an ear 543 formed at right angles to the free end of a horizontal arm 544 of a bellcrank 545 pivoted on a stud 546 of frame plate 347. Bellcrank 545 is also provided with an upright arm 547, the upper end of which is maintained in active engagement with a stud 548 at the lower end of arm 532 by a spring 549, which spring is connected at its one end to a stud on arm 547 and at its other end to an ear 550 formed at the lower extremity of arm 532. Thus, it can be seen that upon clockwise rocking of bellcrank lever 533, ear 543 is resiliently urged by spring 549 into engagement with the peripheral surface of clutch disk 529 and into the rotational plane of nose 530 of pawl 527. Conversely, when bellcrank 533 is restored to its full-cycle clutch-disengaging position, the ear 543 is rocked clockwise to effect engagement of the clutch 522. A rebound of clutch 522 is prevented in either disengaged position thereof in a manner similar to that of clutch 500, as a spring 551 normally urges a pawl 552 in a counter-clockwise direction about its pivot 553 on the frame of the machine. Upon disengagement of the clutch in either of its inoperative positions, the nose of pawl arm 552 is moved into a corresponding notch of a detent wheel 554, which is most clearly seen in Fig. 23.

XVII. *Accumulator and pin carriage shift control*

Irrespective of which key 36, 37 or 38 is depressed, the multiplying operation proceeds in the same manner once it is enabled by the overstroke of the shift mechanism upon return of the carriage to the left-end position. It will be recalled that upon such overstroke, lever 462 is rocked clockwise and latched (Fig. 15) to enable the step-by-step return of the alinged multiplier rack whenever feed pawl 318 is moved to its active position, and to enable the engagement of the clutches 500 and 522 for postively conditioning the desired setting arm and subsequently engaging the plus-minus gears.

The active rack 258 (Fig. 13) is returned step-by-step to its "0" position with the oscillation of the enabled pawl 318, and during its last step of movement operates to control an ordinal right shift of the accumulator carriage and a similar ordinal right shift of the pin carriage, whereupon the next higher order rack 258 is moved into active position. During this last step of movement the active rack 258 engages ear 536 to rock lever 533 (clockwise in Fig. 13 and counter-clockwise in Fig. 21), whereupon ear 531 of lever 533 is restored to its clutch-disengaging position. Simultaneously, stud 548 rocks bellcrank 545 to remove the ear 543 from its engagement with the nose 530 to release pawl 527 for engagement by notch 524 of the driving member. Cluch 522 then becomes effective to enable the right shift mechanism for the accumulator carriage and to effect a right shift of the pin carriage as well as to restore the plus-minus gears to their neutral position.

Means are provided for maintaining lever 533 in the clutch-disengaging position upon movement thereto by the active rack 258, thereby retaining ear 536 out of engagement with the rack segment during the shifting operation. For this purpose, an arm 558 of a latch lever 559 (Fig. 13) pivoted on frame plate 321 is offset laterally near its end to extend beyond the adjacent frame plate and is provided at its end with a V-notch for a camming engagement with a pin 560 on arm 495. In the normally inoperative position of arm 495 and therefore lever 533, as seen in Fig. 13, ear 550 on arm 532 is operatively positioned for engagement by a shoulder 561 on the lower edge of arm 558 under the urgency of a spring 562. However, since the pin 560 is bottomed in the V-notch of arm 558, shoulder 561 is restrained from engagement with the ear 550. Similarly, upon the initial movement of the arm 495 and bellcrank 533 to their operative position, pin 560 controls the downward movement of the arm 558 to permit ear 550 to be moved to the right of the shoulder 561. A depending arm 563 of latch lever 559 carries a stud 564 embraced in a bifurcation of an ear 565 depending at right angles from the end of an arm of a bellcrank 566 and extending beyond frame member 46. Bellcrank 566 is pivoted at 567 in a horizontal plane on a supporting member 568 formed in frame plate member 46, and has an extended arm 569 which normally lies out of the rotational plane of a stud 570 on shiftable collar 334 in the operative position thereof.

Referring to Fig. 13, when a value has been entered in the multiplier pin carriage, followed by rocking movement of arm 495 and lever 533, stud 560 and ear 550 are simultaneously moved to the right, whereupon spring 562 urges the lower surface 571 of the arm 558 into engagement with the upper edge of ear 550. As each active rack 258 of the pin carriage is restored to its "0" position where it engages ear 536 of lever 533 to condition the machine for a right shift of the accumulator and the pin carriage, ear 550 is moved forwardly, or clockwise, for engagement by shoulder 561 of latch lever 559. This movement of the lever 559, under the urgency of spring 562, is sufficient to impart a counter-clockwise rotation to bellcrank 566, as viewed from the top, to move the arm 569 laterally for active engagement by stud 570 near the end of the right shift cycle, thereby releasing the latch 559. Upon release of the latch, tensioned spring 539 urges lever 533 (counter-clockwise in Fig. 13 or clockwise in Fig. 21) to again effect engagement of clutch 522.

Following 180 degrees of the multiplying cycle wherein rack 258 is restored to its "0" position (Figs. 13 and 21), clutch 522 is engaged when lever 533 serves to release ear 543 from engagement with nose 530 of pawl 527. Simultaneously, ear 531 of lever 533 is moved to its clutch-disengaging position where it is latched by latch lever 559, as previously described. It will be recalled that the initial 90 degree rotation of clutch 522 serves through cam 401 (Figs. 17 and 21) and actuating plate 380 to engage the plus-minus gears, whereupon clutch 522 is disengaged when nose 530 contacts ear 543. In the next 75 degree rotation of clutch 522 (Fig. 21), following its re-engagement by the rocking of lever 533 to its clutch-disengaging position and consequent rocking of bellcrank 545 to cause ear 543 to release nose 530 of the clutch pawl, i.e., after 255 degrees of the cycle in which the active rack 258 reaches its "0" position, clutch 522 serves to disable feed pawl 318 (Fig. 13), to engage the right shift clutch for the accumulator carriage, and to enable the right shift mechanism for the multiplier pin carriage. Clutch 522 also serves to positively centralize the plus-minus gears following the ensuing 90 degree rotation thereof, or after 345 degrees of the cycle, when cam 401 (Fig. 17) is operative to move actuating plate 380 and therefore active setting arm 378 or 392 forwardly, or to the right.

A cam 575 is rotatably mounted on shaft 62 (Figs. 20 and 23) and is secured to driven clutch disk 503 for relative rotation therewith by any suitable means, such as pins 576, and is spaced from disk 503 by detent wheel 517, which is likewise secured thereto by the pins. A hole in cam 374 embraces a stud 577 on cam 575 for rotation therewith under the control of clutch 500. Cam 374 is maintained in spaced relation to cam 575 by a sleeve on shaft 62 and a roller on stud 577 to permit free movement therebetween of lever 578 rotatably mounted on a shaft 579 suitably journalled in the framework of the machine. An arm 580 having its hub secured on transverse shaft 336, is offset laterally intermediate its ends and carries a roller 582 at its upper extremity which is normally maintained in engagement with the high point of cam 575 by a spring 583 (Figs. 15, 20 and 23). A similar arm 584 (Figs. 21 and 23) is mounted in an annular groove in the hub of arm 580 and is maintained in contiguity with arm 580 by pins 585, thus forming an integral unit. Arm 584 is offset laterally intermediate its ends in opposition to the lateral offset of arm 580, and carries a roller 586 at its free end which is normally maintained out of engagement with a cooperating cam 587 by roller 582 and its engagement with the high point of cam 575. Cam 587 is secured to detent wheel 554 and driven disk 529 of clutch 522 intermediate cam 401 and disk 529 by similar pins 588 (Fig. 23), whereby rotation of each cam is controlled by clutch 522. Arm 580 carries a stud 589 adjacent its upper end engaging in an elongated slot in one end of a link 590 (Figs. 15 and 20), which is pivoted at its other end to an arm 591 secured on shaft 326. Thus, it can be seen that upon clockwise rocking of shaft 326 to enable feed pawl 318, arm 591 serves to move link 590 to the right, whereupon the left end of the slot abuts the stud 589 for subsequent control of the feed pawl 318 by arms 580 and 584.

As previously described, following the rocking of arm 495 and lever 533 after 240 degrees of the resetting cycle, clutch 500 is engaged and after 30 degrees rotation thereof the high point of cam 575 (Fig. 20) is moved from engagement with roller 582 whereupon spring 583 urges arms 580 and 584 rearwardly (counter-clockwise in Fig. 20). However, following this 30 degree rotation of clutch 500, that is, after 270 degrees of this cycle, clutch 522 (Fig. 21) is engaged and cam 587 driven thereby to immediately restore arms 580 and 584 to their normally inoperative position shown. Clutch 500 is rotated another 240 degrees until nose 498 contacts ear 513 to maintain clutch 500 disengaged until near the end of the last cycle of the multiplication operation. Similarly, clutch 522 (Fig. 21) is initially rotated 90 degrees, or until nose 530 contacts ear 543, in which position clutch 522 is maintained disengaged until restoration of the active multiplier rack 258 actuates lever 533 to re-engage the clutch for a right shift operation.

Upon re-engagement, clutch 522 serves to rotate cam 587 (Figs. 21 and 23) approximately another 75 degrees at which time spring 583 becomes effective to urge arms 580 and 584, counter-clockwise in Figs. 20 and 21, to impart a similar rotation to arm 591 and shaft 326 (Fig. 15), thereby moving pawl 318 to its inactive position. Shaft 336 is likewise rocked with arms 580 and 584 to engage the right shift mechanism, and for this purpose has arm 594 (Fig. 5) slidably and nonrotatably engaged thereon. Arm 594 carries pin 595 normally out of alignment with upstanding arm 596 rotatably mounted on shaft 336 and having stud 597 in engagement with depending arm 147 which carries pin 146 operative to control the right shift push rod 137. Arm 594 is held in its normally inoperative position against the urgency of spring 598 by slide 599 which is slidably mounted on shaft 336 and abutting shift rack 332 of pin carriage 256. The first step of shifting movement of carriage 256 during setting up of the multiplier is insufficient to align the stud 595 of arm 594 with the leading edge of arm 596, such alignment occurring after the second shift, i.e., when the second multiplier digit is entered, which is the extent of sliding movement permitted slide 599 and arm 594. As previously described, shaft 336 (Fig. 13) also operates arm 335 having pin 337 engaged in a grooved collar of slidable actuator 334 for shift rack 332 of the pin carriage 256, so that this shift is also enabled by the same rocking movement of shaft 336. Thus, eccentrically controlled pawl 333 is driven from shaft 178 to restore pin carriage 256 one ordinal position to the right, as viewed from the front of the machine, all as more fully described in said Patent No. 2,371,752. Following approximately 60 degrees of the immediate cycle, right shift clutch 122 may be engaged, however, tooth 123 is not effective to shift the accumulator until the beginning of the ensuing cycle.

During the subsequent 80 degree rotation of clutch 522 following the spring-urged rocking of arms 580, 584 and shaft 336, that is, after approximately 350 degrees of the immediate cycle, cam 401 (Figs. 17, 21 and 23) serves to centralize the plus-minus gears. Thus, the plus or minus gears are maintained in engagement with the accumulator dial shaft gears until the end of the instant cycle immediately prior to the shifting cycle. In the first 90 degrees of the ensuing shift cycle, however, clutch 522 continues to be rotated to its normal full-cycle position shown in Fig. 21, or until nose 530 engages the ear 531 to disengage the clutch.

As pointed out above, during the last step movement of rack segment 258, as the machine is conditioned for a right shift operation, spring 562 moves shoulder 561 (Fig. 13) behind ear 550 to maintain lever 533 in its rocked position. When so rocked, latch lever 559 moves arm 569 into the rotational plane of stud 570 on collar 334. Immediately following a shifting movement of the next higher order rack 258 into active position, i.e., after approximately 240 degrees rotation of collar 334, stud 570 engages the end of arm 569 to release latch lever 559, thereby permitting spring 539 (Fig. 21) to enable engagement of clutch 522 and to move ear 536 of lever 533 (Fig. 13) into active position with respect to the active rack 258 if the next active multiplier rack is set to a multiplier digit value. Shifting of the pin carriage is effected against the urgency of spring-pressed bellcrank 300 (Fig. 24) and the carriage is retained in position after each shifting movement by escapement stop pawl 304 (Fig. 12), whose inclined edge will be engaged and cammed down by the adjacent tooth 271 to the right thereof during each step of movement.

The accumulator and pin carriage shift mechanisms are disabled during the multiplying operation, and feed pawl 318 is enabled after one cycle of shifting movement if a value other than "0" is set in the next active multiplier rack 258. If rack 258 is not set, that is, is at "0," another shifting cycle follows immediately, since lever 533 may not be rocked, counter-clockwise as viewed in Fig. 13 or clockwise as viewed in Fig. 21, sufficiently to permit engagement of clutch 522 as described. However, if clutch 522 is re-engaged, cam 587 serves to restore arms 580, 584 to their inoperative position (Figs. 21 and 23), whereupon spring 488 (Figs. 13 and 15) again enables pawl 318, and cam 401 is effective to re-engage the plus or minus gears with the accumulator wheel gears.

From the above description it is seen that at the end of each ordinal multiplication, the pin carriage is shifted one step simultaneously with the accumulator carriage to bring the multiplier rack 258 of the next higher order into active position. The foregoing sequence of operations continues until each active rack has been restored to "0," at which time arm 495 is restored to its normal clockwise position, as will now be described.

XVIII. Pin restoring means

Upon return of the pin carriage 256 to its right-hand, or normally inoperative, position, means are brought into play to restore each of the pins 257 (Figs. 9, 10 and 11) which have been previously set and also to release any multiplication control key which has been depressed, thereby effecting a clockwise rocking of arm 495 (Fig. 15) to its inactive position. When the last, or highest order, rack 258 has been restored to "0," the shift control is again operated to move the pin carriage one ordinal position to the right of feed pawl 318, in which position ear 536 (Fig. 15) overlies stop 537 on the pin carriage frame, thereby preventing clockwise rocking of lever 533 (Fig. 21), and causing an idle shifting movement of the pin carriage. However, it will be recalled that upon setting up of the multiplier, the pin carriage must escape two ordinal positions to the left to move pin 595 (Fig. 5) into cooperative relation with arm 596 to control the right shift of the accumulator. Therefore, as the last, or highest order, rack 258 is moved into active position relative to pawl 318, pin 595 is moved to the right out of engagement with arm 596, as seen in Fig. 5, so that the last two right shift operations are ineffective to shift the accumulator. Following the idle shifting movement of the pin carriage, escapement stop pawl 304 (Fig. 12) is ineffective to retain the carriage in this position and spring 303 (Fig. 24) serves to return the pin carriage one step to the left, i.e., to its last shifted position, or one ordinal position to the right of feed pawl 318, where it is held by the engagement of stop pawl 304.

Referring now to Figs. 9, 10 and 11, during the idle shifting movement of the pin carriage 256, means are provided for restoring to an inactive position any or all pins 257 which have previously been set. As previously described, pin-restoring plate 276 is so constructed and assembled that the lower surface thereof engages lower shoulder 275 of any pin which has been moved to its active position. Restore plate 276 is provided on either side thereof with similar upright arms 602 which form a U-shaped member mounted for reciprocatory movement within the framework of the pin carriage 256. To maintain plate 276 in a parallel plane relative to holding plate 264 during such movement, each arm 602 is provided with a vertical longitudinal slot 603 engaging a pin 604 on the respective carriage frame plates 262. At its upper end, each arm 602 is provided with a stud 605 slidably engaged in an open end slot 606 of the frame plates 262 and having a roller 607 disposed thereon for engagement by similar cam portions 608 of segmental gears 296 secured on either end of shaft 282. One of the gear segments 296 is meshed with a single idler gear 610 rotatably mounted on a stud 612 on right-hand frame plate 262 of the pin carriage 256, which idler gear 610 is also in mesh with a gear sector 613 rotatably mounted on a stud 614 of the frame plate 262. Rocking movement of sector 613 therefore serves to impart rotation to shaft 282 and therefore each segment 296 and cams 608. Gear sector 613 carries an ear 615 formed at right angles thereto and normally maintained in engagement with a protrusion of frame plate 262 under the urgency of a spring 616. During the idle shifting movement of pin carriage 256, an ear 617 of gear sector 613 is moved into the rotational plane of a cam 618 secured on shaft 170 continuously driven by bevel gears 177 as described hereinbefore. After a 180 degree clockwise rotation of cam 618 during the last idle shift cycle, cam 618 engages ear 617 to rock gear sector 613, gear segments 296 and therefore shaft 282, counter-clockwise as viewed in Fig. 9. Cams 608 of segments 296 then serve through rollers 607 to move pin-restoring plate 276 downwardly against the urgency of similar springs 619, thereby restoring all actively set pins to their inactive positions.

It will be recalled that upon the setting up of each digit of a multiplier value into the pin carriage, nose 297 (Fig. 9) of a conventional selection mechanism is moved to the left in a well-known manner to release holding pawl 284, thereby permitting rotation of the associated multiplier rack segment 258 until its stop end 283 engages a selectively set pin 257 under the urgency of a spring not shown. Each pawl 284, upon release thereof, is maintained in its rocked position by the engagement of notch 290 of the associated latch arm 288 with stud 287 on the lower end of the pawl. In the latching position of each arm 288, the nose thereof engages the lower surface of restore plate 276. It becomes obvious, therefore, that during the shifting movement of the pin carriage following the restoration of the previously active rack to its "0" position, the rack is immediately released to its originally set position as determined by the set pin associated therewith. Consequently, as the pin carriage is moved into its rightmost position during the idle shifting movement thereof, the multiplier value, as originally set up, is again standing in the pin carriage, but is not visible through sight opening 292 (Fig. 1). However, in this rightmost position, when the cam 618 rocks shaft 282 (counter-clockwise as viewed in Fig. 9), transverse bar 294 supported between similar arms 295 of gear segments 296 serves to restore all set segments 258 to their "0" position. Substantially simultaneously, gear segment 296 also serves to move restore plate 276 downwardly, thereby returning the set pins 257 to their inactive position and disengaging the latch arms 288, rocking them counter-clockwise against the urgency of springs 285 to release holding pawls 284 for engagement with the stop ends 283 of the segments 258, under the urgency of the tensioned springs 285.

XIX. *Multiplication control key release*

A selectively set control key 36, 37, or 38 may be released from its depressed position in a conventional manner. That is, near the end of the idle shifting movement of the pin carriage 256, bellcrank 300 and therefore arm 350 (Figs. 14 and 24) is rocked (clockwise in Fig. 24) to disable latch arm 343 and latch arm 345, whereupon the depressed control key is free to rise. Rocking of the shaft 346 (Figs. 14 and 15) to which latch levers 343 and 345 are secured, also serves to release latching bellcrank 475 to permit the return of control lever 462, bellcrank 492, and arm 495 to their inoperative position under the urgency of spring 504. Similarly, spring 504 serves through bellcrank 492 to move link 486 downwardly to its inactive position. To release the latching bellcrank 475, a horizontally extended arm 624 is secured to one end of the latch lever shaft 346 and carries a pin 625 engaging in an aperture in the horizontally disposed arm of latch bellcrank 475 for control thereof. Upon latching engagement of shoulder 478 with ear 479 of lever 462 the inner edge of the aperture in latching bellcrank 475 engages pin 625 of arm 624. Hence, when shaft 346 is rocked (counter-clockwise as viewed in Fig. 14, or clockwise as in Fig. 15), pin 625 rocks bellcrank 475 counter-clockwise to release the latching shoulder 478 from its engagement with the ear 479, against the urgency of spring 480.

It will be recalled that during the last, or idle, shifting movement of the pin carriage 256, clutch 522 and the cams 401 and 587 associated therewith are maintained in the position shown in Fig. 21 by virtue of the fact that lever 533 is held against clockwise rocking movement thereof by the engagement of ear 536 with stop 537 (Fig. 15). Likewise, it will be recalled that upon initiation of a multiplication operation proper, arm 495 (Fig. 20) was rocked counter-clockwise to engage clutch 500 for 270 degrees rotation of conditioning cam 374 and right shift control cam 575, whereupon the clutch is immediately disengaged by ear 513. In this relative position of cams 587 and 575 (270 degrees counter-clockwise from the positions shown in Fig. 20), right shift control arms 580 and 584 are free to rock (counter-clockwise in this figure) under the urgency of spring 583. Throughout the multiplication operation, the rocking of control arms 580, 584 to enable operation of feed pawl 518 and disable the shifting mechanisms or disable the feed pawl and enable the shifting mechanisms, is under the sole control of cam 587. This cam, as explained above, is rotated by the clutch 522 (Fig. 21), which is controlled by the operation of bellcrank 533 from its engagement with multiplier segments 258. Upon release of the depressed control key when arm 495 is rocked (clockwise as viewed in Figs. 15 and 20), stud 515 thereon rocks bellcrank 510 to remove the ear 513 from its engagement with the nose 498, thereby engaging clutch 500 for 90 degrees rotation to its full-cycle position when the nose of cam 575 restores arms 580 and 584 to their inoperative position. Similarly, cam 374 enables the release of the active setting arm 378 or 392 from engagement with respective pins 386 or 395 under the urgency of either spring 388 or 396. Following this 90 degree rotation of clutch 500, the nose 498 again engages ear 497, whereupon the clutch becomes disengaged and cam 575 serves to retain arms 580 and 584 in their inoperative position for subsequent and varied machine operations.

The release of control keys 36, 37, or 38 also operates to enable the clockwise rocking of arm 415 and therefore shaft 156 (Fig. 18) under the urgency of spring 249 (Fig. 3) to release the latch 186 of the left shift and resetting control mechanism (Fig. 7) and to disengage the clutch and open the motor contacts. In addition to the functions controlled by the release of the keys 36, 37 and 38, the release of key 37 also serves to restore pin 375 (Fig. 15) of sign character control link 368 to its operative position with respect to ear 377 on positive setting arm 378.

To prevent relatching of a multiplication key in depressed position if held there after the multiplying operation, a lever 626 (Fig. 15) is provided, pivoted at 627 on frame plate 347 and pivotally connected at its lower end to one end of a link 628, the other end of which is provided with a longitudinal slot embracing stud 420 on arm 415 (Figs. 15 and 18). Lever 626 is urged in a clockwise direction by the rearward movement of link 628 under the influence of a spring 629, and has its upright end adjacent and normally above a square stud 630 on arm 624 secured on shaft 346, which also carries key latch arms 343 and 345 (Figs. 8 and 14). As previously explained, the shaft 346 is operated upon depression of a multiplication key so that it will rock arm 624 upwardly and immediately downwardly as the key latch engages, so that stud 630 provides a stop for lever 626. Depression of a key also rocks arm 415 (Fig. 18) counter-clockwise, moving pin 420 to the rearward end of the slot of link 628. Subsequently, if the key is maintained depressed when the key release mechanism is operated, arm 624 is rocked clockwise (Fig. 15) sufficiently to permit the upper end of lever 626 to move under square stud 630 under the urgency of the spring 629, thereby maintaining the key latch inactive.

If a multiplication key is partially depressed through inadvertence or mistake sufficiently to rock shaft 156 (Fig. 15) for the initiation of a multiplication operation, but not sufficient to become latched, with a value standing in the multiplier pin carriage, and with the accumulator carriage in its left-end position, the overstroke cycle of the left shift mechanism would immediately rock lever 462 clockwise to its latched position, whereupon arm 415 and shaft 156 would immediately be restored to their normally inoperative position following the first cycle under the urgency of spring 249. Thus, with the pin carriage out of its home, or inoperative, position, the key latch releasing mechanism would not operate to release latching bellcrank 475 (Fig. 15) to enable restoration of lever 462 to its inactive position. Hence, a subsequent depression of any of the various other control keys would result in a misoperation and could conceivably cause serious damage to the operating machanism of the machine. In order to preclude any such misoperation or difficulty, means are provided for maintaining arm 415 and therefore shaft 156 in its counter-clockwise rocked position (Figs. 15 and 18) until the termination of a multiplying operation, when pin carriage 256 is shifted to its right-hand position where it becomes effective to rock shaft 346. Arm 624 and pin 625 are then effective to release latch lever 475, whereupon spring 504 restores control lever 462 to its inactive position. For this purpose, link 505 is provided at its right end with a longitudinal slot embracing stud 420 on arm 415. When arm 415 is rocked counter-clockwise, pin 420 is moved to the left end of the slot in link 505. With the pin 420 in this position, the forward end of the slot is moved into engagement with the pin when the overstroke cycle of the left shift mechanism rocks shaft 459 to move control lever 462 to its latched position and moving link 505 rearwardly. Consequently, arm 415 is held in its counter-clockwise rocked position until the multiplication operation has been concluded and latch 475 has been released.

XX. *Multiplier correction*

The multiplier correction key 39 (Fig. 8) has a pin-and-slot connection 634 with bellcrank 635 pivoted at 636 on frame plate 348. The depending arm of the bellcrank has pin 637 thereon which underlies the end of arm 470 and is operative to lift the notch therein out of engagement with the pin 469 of bellcrank 468 when the multiplier correction key is depressed. This prevents initiation of a multiplying operation upon a rocking of the override pawl and consequent rocking of shaft 246 which would occur if the carriage is in, or reaches, the extreme left-hand position during the correction operation, for normally rocking of shaft 246 rocks shaft 459 (clockwise as viewed in Fig. 8 or counter-clockwise as viewed in Fig. 15), as previously described. The pin 637, in lifting the rear end of the arm 470, brings it into engagement with pin 638 (Figs. 8 and 13) on arm 335 which, when rocked clockwise, it will be recalled, lifts the collar 334 and operating shift pawl 333 into operative engagement with the rack 332 of the multiplier pin carriage 256. When the key 39 is depressed and the bellcrank 635 is rocked (counter-clockwise in Fig. 8), the shaft 156 is rocked by reason of link 639 which interconnects the bellcrank and arm 640 secured to shaft 156. This rocking of shaft 156, as previously described, causes operation of the power-setting unit (Figs. 6 and 7) to initiate a left shift and resetting operation of the accumulator. However, it is undesirable to reset the values in the accumulator to "0" in the correction operation, so link 639 (Fig. 8) carries a pin 641, which engages arm 437 of resetting pusher link 209, to rock the nose 212 thereof out of operative engagement with the pusher rod 213. It will likewise be recalled that rocking of shaft 156 (clockwise in Fig. 3) serves through arm 199 and slide 201 to engage the clutch and close the motor contacts. When the shaft 156 is rocked to initiate the operation, the main drive shaft 62 (Fig. 13) operates through bevel gear connection 179 to rotate shaft 178, which shaft rotation serves through shift pawl 333 to move the pin carriage to its rightmost position. Immediately upon reaching this position, the pinboard clearing segment 613 is moved into the plane of constantly rotating cam 618, which is driven from shaft 178 (Figs. 9 and 13) through bevel gear connection 177. The clockwise rotation to cam 618 (Fig. 9), it will be recalled, rocks sector 613 and therefore gear segment 296 to restore the adjusted rack segments 258 to their "0" position, and through cam 608 to move pin restore plate 276 downwardly, moving the actively set pins to their inactive position and simultaneously releasing latch pawls 288 for holding pawls 284 to effect the latching of the rack segments 258 in their "0" positions.

XXI. *Multiplier repeat mechanism*

Means are provided for enabling the automatic re-entry of the previously set multiplier value into the multiplier pin carriage for subsequent control fo a multiplication operation upon depression of a multiplication key. As pointed out above, upon restoration of each active multiplier rack 258 to its "0" position during a multiplication operation and immediately following the disablement of feed pawl 318 for an ordinal right shifting movement of the pin carriage 256, the rack segment returns to its previously set position determined by the previously actively positioned pin 257 associated therewith. Consequently, following the return of the actively positioned highest order rack 258 to "0," and the subsequent right shift of the pin carriage, the multiplier factor previously set in the pin carriage is therefore re-entered therein, since holding pawls 284 (Fig. 9) are disabled and latched during the selective setting of pins 257.

The subsequent idle shifting movement of the pin carriage serves to move sector 613 into cooperative relation with cam 618 to restore all set pins to their inactive position, to simultaneously release effective latch arms 288, and to return all rack segments 258 to their "0" position where they are held by holding pawls 284. Thus, it can be seen that if the right shifting movement of the pin carriage 256 is terminated immediately prior to the final, or idle, shift thereof, i.e., the last idle cycle is not operated to restore all set pins 257 to their inactive position and to return the associated rack segments 258 to their latched position, and the escapement mechanism is disabled to release pin carriage 256 for leftward movement to a predetermined position, each repositioned segment 258 again becomes operative to control a subsequent multiplication operation in a manner explained hereinbefore.

At the conclusion of a multiplying operation when tooth 644 of two-tooth ratchet 501 (Fig. 22) becomes operative to drive clutch 500 through its last 90 degrees of rotation, a roller on pin 577 (Figs. 15 and 23) engages a cam surface on the lower end of a lever 578 to rock lever 578 counter-clockwise about its pivot 579. Lever 578 carries a link 645 pivotally connected thereto at 646. Link 645 is provided at its right, or forward, end with a hook 647 for operative engagement with a pin 648 on the free end of an arm 649 of a bellcrank 650 pivoted at 651 on frame plate 347. Pin 648 normally overlies the nose of the hook 647, which position of the pin is determined by the engagement of a horizontally extended arm 652 of bellcrank 650 with a stop 653 under the urgency of a spring 654. Link 645 carries a depending arm 655 having a pin 656 at the lower end thereof underlying a camming edge 657 at one end of an arm 658 of a bail 659 pivotally mounted on a pin 660 on frame plate 347. A second arm 661 of bail 659 extends upwardly and is bifurcated to engage a pin 662 on multiplier repeat control key 663 slidably mounted in brackets 664 (Figs. 14 and 15) secured to upper keyboard plate 260.

In the inoperative position of the key 663, as shown in Fig. 15, and with the initial rotation of clutch 500 and therefore pin 577, lever 578 is rocked clockwise under the urgency of spring 654 to move hook 647 to the right of pin 648, pin 656 being reciprocated along the cam surface 657. At the conclusion of a multiplication operation and in the last 90 degree rotation of clutch 500, pin 577 serves to rock lever 578 counter-clockwise for an idle rearward movement of the hook 647. If, however, control key 663 is moved forwardly to its operative position, bail 659 and therefore arm 658 are rocked clockwise (Fig. 15), in which event spring 654 urges hook 647 into engagement with pin 648 upon the initial counter-clockwise rotation of clutch 500 and therefore pin 577. In terminating a multiplication operation with key 663 in its operative position, pin 577 rocks lever 578 (Fig. 15) to impart a counterclockwise rotation to bellcrank 650, whereupon the forward end of arm 652 engages a laterally extended arm 665 of escapement stop pawl 304 (Fig. 12) to move the nose thereof out of engagement with the adjacent pin carriage rack tooth 271. Thus, the pin carriage 256 is released for unrestrained leftward movement (as viewed from the front of the machine) to a predetermined active position wherein the nose of stop pawl 304 again becomes active to engage between the teeth 271 of the rack 269.

Means are provided under the control of repeat key 663 for terminating the leftward movement of the pin carriage in a predetermined position upon the disabling of stop pawl 304. For this purpose, key 663 carries a pin 670 (Fig. 14) engaged in a cam slot 671 in the free end of an arm 672 pivoted at 673 on a bracket mounted on upper keyboard plate 260. Arm 672 is provided with a protrusion 674 positioned thereon in operative relation to cam slot 671 and overlying an ear 675 formed at a right angle to the end of a horizontal arm of a bellcrank 676 pivotally mounted at 677 on an upright bracket secured on lower keyboard plate 261. The lower end of a depending arm 678 of bellcrank 676 is bifurcated to engage a pin 679 at the upper end of one arm 680 of a three-armed lever 681 pivotally mounted for oscillatory movement on a stud 682 in side frame 347. A second arm 683 of three-armed lever 681 is angularly disposed to the left of arm 680 and carries a pin 684 overlying an arm 685 of a lever 686 pivotally mounted adjacent lever 681 on stud 682. Arm 685 is normally urged into engagement with pin 684 by a spring 687 secured at its one end to a stud on frame plate 347 and at its other end to a square stud 688 on an arm 689 of lever 686. A third arm 690 of three-armed lever 681 is angularly disposed to the right of arm 680 and carries a stud 691 supporting one end of a spring 692, the other end of which is secured to a stud on the frame, which spring serves to maintain ear 675 in operative engagement with protrusion 674 of arm 672. Arm 685 is provided with a tooth 693 for engagement in a selective notch between adjacent teeth 694 of an arcuate rack 695 formed at right angles to the end of an arm 696 pivotally mounted at 301 on the base of the machine (Fig. 24). A spring 697 normally urges a bent-over ear 698 on arm 696 into engagement with arm 350 of bellcrank 300 for rocking movement therewith, under the urgency of spring 303. In the rearward position (Figs. 14 and 15) of multiplier repeat key 663, tooth 693 is held out of engagement with the arcuate rack 695 under the urgency of spring 687. However, if a single multiplier factor is to be used for a plurality of multiplication operations, the factor is first set up in a conventional manner by the depression of keys 34 and with the entry of each digit of the factor, bellcrank 300 operates to escape the pin carriage one ordinal step (to the left as viewed from the front of the machine). With each stepped movement of the pin carriage, bellcrank 300 (Fig. 24) is rocked counter-clockwise under the urgency of spring 303 and therefore arm 696 is likewise rocked to position a notch of rack 695 into cooperative relation with the tooth 693 of arm 685. Thus it can be seen that the number of digits of the multiplier factor determines the notch for engagement by tooth 693, e.g., in using a factor of four digits the pin carriage will escape four ordinal positions to the left and the fourth notch from the left in the rack 695 (Fig. 14) will be positioned immediately beneath tooth 693. Therefore, following the entry of the multiplier factor, key 663 is moved forwardly (to the left as viewed in Fig. 14) to cam arm 672 and bellcrank 676 in a clockwise direction, whereupon lever 681 serves through pin 684 to rock tooth 693 into engagement with the aligned notch of the rack 695. There is no notch provided in rack 695 representative of the initial, or home, position of the pin carriage 256 since it would serve no purpose whatever. Thus, if a multiplier factor has not been entered in the pin carriage to effect an escapement thereof, movement of multiplier repeat key 663 is prevented by the engagement of the tooth 693 with the top edge of rack 695.

Means are provided for positively maintaining tooth 693 in its notch engaging position until a constant multiplier factor being utilized is no longer desired, as will be hereinafter described. Likewise, key 663 is resiliently maintained in its operative position by the upper end of slot 671 and the associated pin 670. The configuration of slot 671 is such that the upper end thereof forms a detent for pin 670 under the influence of spring 692 whenever arm 672 is rocked (clockwise in Fig. 14) to its operative position, thereby preventing return of key 663 to its inoperative position. Referring to Fig. 14, to latch tooth 693 in its active position a latch lever 704 is pivotally mounted on transverse shaft 459, having the leading edge thereof resiliently urged by a spring 705 against one surface of square stud 688 of lever 686. As tooth 693 is moved into engagement with a selected notch of rack 695, square stud 688 moves counter-clockwise against the urgency of spring 687 and spring 705 serves to move a notch 706 in the upper end of latch lever 704 into engagement with stud 688. Since rack 695 and therefore arm 696 are positively held against movement, the ordinal return of the pin carriage to the right-hand, or home, position during a multiplication operation serves, through bellcrank 300 (Fig. 24), to tension spring 697. Consequently, during the last part of the last multiplication cycle following the release of multiplication control key 36, 37, or 38, stop pawl 304 (Fig. 12) is disabled and spring 303 moves the multiplier pin carriage unrestrainedly to the left until stopped by the engagement of arm 350 of bellcrank 300 with the ear 698 on arm 696.

It will be recalled that following a multiplying operation and in the penultimate step of movement of the pin carriage, each of the segments 258 will have been released to their previous multiplier factor setting. Thereafter, as the pin carriage is shifted into its right-most position, all of the set pins are restored to their inactive position simultaneously with the return of all rack segments to their "0" latched position. When it is desired that the previously set multiplier be used as a constant factor in a plurality of subsequent multiplying operations, the shifting movement of the multiplier pin carriage must be terminated in the next to the last step of movement thereof, thereby preventing operation of the clearing mechanism. For this purpose an inverted L-shaped lever 707 is rockably mounted for sliding movement by the engagement of a bifurcation 708 in the rearward end thereof with transverse shaft 459. The vertically extended end of lever 707 lies adjacent arm 685 of lever 686 and is supported for reciprocatory movement by the engagement of an open end slot therein with pin 684 on arm 683 of lever 681. Near its vertex, the upwardly extended arm of lever 707 is provided with a longitudinal slot engaging a pin 709 on the lower end of latching lever 343. Hence, a rearward movement of lever 707 imparts a counter-clockwise rotation to latching levers 343 and 345 (Figs. 8 and 14), thereby releasing a depressed control key 36, 37, 38 or 39, against the urgency of spring 349. Lever 707 is provided at its rearward end with a vertical extension 710 operatively related to an ear 711 on latching lever 704. Upon counter-clockwise rocking of latching lever 704 under the urgency of spring 705, when notch 706 engages beneath square stud 688 of lever 686, ear 711 abuts projection 710.

When rocked downwardly to its active position, the leading vertical edge of lever 707, which lies in a position to the left of the lower end of latching lever 343, is engaged by arm 350 of bellcrank 300 in the next to the last step of shifting movement of the pin carriage, thereby releasing a depressed control key and releasing latch 704 from its engagement with square stud 688. However, with key 663 in its operative position for a repeat multiplying operation, notch 706 of latching lever 704 is immediately re-engaged with square stud 688, upon disabling of stop pawl 304 (Fig. 12) for movement of the pin carriage back to the left (its active position) under the influence of bellcrank 300 and spring 303.

In the manner described above, at the conclusion of each multiplying operation, the multiplier racks 258 are automatically reset to the constant multiplier value and the pin carriage is tabulated to its predetermined active position. The operator then sets the next multiplicand in the keyboard and initiates the next multiplying operation by depression of either keys 36, 37 or 38.

The machine may be conditioned for nonrepeat multiplication at any time during the multiplying operation by the rearward movement of key 663, to the left as viewed in Fig. 15, or the rightward movement thereof, as viewed in Fig. 14. Referring to Fig. 15, rearward movement of the key 633 operates through bail 659 and therefore arm 658 to rock lever 645 clockwise about its pivot 646, thereby disengaging the hook 647 from its engagement with pin 648. Thus, in the last part of the last multiplying cycle, when clutch 500 is rotated its final 90 degrees, pin 577 rocks lever 578 to move link 645 rearwardly without effecting a release of stop pawl 304 (Fig. 12). Likewise, immediately upon return of key 663 to its inoperative position (Fig. 14) three-armed lever 681 is rocked clockwise under the urgency of its spring 692 to impart a counter-clockwise rotation to bellcrank 676. Clockwise rocking of lever 681, through pin 684, moves the forward end of lever 707 upwardly, thereby permitting the idle shifting movement of the pin carriage prior to the engagement of arm 350 of bellcrank 300 with the lower end of latch-releasing lever 343. However, movement of key 663 to its inoperative position during a multiplication operation is not effective to release the nose 693 from its engagement with a predetermined notch in rack 695, since latch 704 remains in its effective position with respect to lever 686 until the termination of the multiplying operation, at which time latching lever 343 is rocked counter-clockwise to release the depressed control key and, through lever 707 and its projection 710, releases the latch 704, thereby enabling spring 687 to rock arm 685 upwardly into engagement with the pin 684. If key 663 is rendered inoperative at the conclusion of a multiplying operation, the subsequent multiplying operation becomes effective to release latch 704, thereby permitting rack 695 and therefore arm 696 to be rocked clockwise (Fig. 24) under the urgency of spring 697 when ear 698 engages arm 350 of bellcrank 300.

When three-armed lever 681, bellcrank 676, and arm 672 are returned to their normally inoperative positions by key 663 at the conclusion of a multiplying operation, multiplier correction key 39 may be depressed to restore the pin carriage to its righthand position in a conventional manner, whereupon bellcrank 300, arm 350 and latching lever 343 operate to move link 707 to the right (Fig. 14) thereby releasing latch 704. Since clutches 500 and 522 are not operated during a multiplier correction operation, lever 578 (Fig. 15) is not rocked to disable escapement stop pawl 304 for the release of the multiplier pin carriage. Therefore, upon return of the pin carriage to the right, the idle shifting movement thereof is not operated to restore all rack segments 258 to their "0" position and the escapement stop pawl 304 becomes effective to hold the pin carriage in the next to the last shifted position thereof.

Means are provided to prevent the depression of the multiplier correction key 39 so long as key 663 is in its operative position. This means is best shown in Figs. 8 and 14. In order to prevent a depression of multiplier correction key 39 when the machine is conditioned for a multiplier repeat operation, an arm 715 of a bail 716 is rockably mounted on shaft 459 and maintained in engagement with stud 691 of three-armed lever 681 under the urgency of a spring 717. Bail 716 carries an arm 718, which is integral with arm 715, the arm 718 having an aperture therein for securing one end of spring 717, the other of which is secured to a pin on arm 406. Arm 718 carries a pin 719 and is urged (counter-clockwise in Fig. 8) by spring 717 to maintain arm 715 in engagement with stud 691 on lever 681. In the operative position of multiplier repeat key 663 and therefore lever 681, spring 717 serves to urge pin 719 to a position underlying the lower end of multiplier correction key 39 to prevent the depression thereof.

From the foregoing description it can be seen that the machine may be conditioned for nonrepeat multiplication my manually setting the key 663 to its inoperative position during a multiplying operation, or by inoperatively positioning key 663 at the conclusion of a multiplying operation, in which case the termination of the succeeding multiplying operation becomes effective to disable the repeat mechanism. If this succeeding multiplication operation is not desired, the multiplier correction key 39 may be depressed, with the key 663 in its inoperative position, to return the pin carriage to its "home" position, to restore the pins 257 and return rack segments 258 to their "0" latched position, and to release latch 704, thereby releasing arm 696 to engage arm 350 of bellcrank 300.

XXII. *Multiplying operation*

As explained previously, the machine is conditioned for a multiplication operation by setting the multiplicand on the numeral keys 22 (Fig. 1) and by depressing the multiplier keys 34, successively, from the highest to the lowest order of the multiplier digits of the multiplier factor and to cause display thereof on the dials 35. As illustrated in Fig. 1, three dials 35 are visible through the sight opening 292, which condition is obtained by three successive depressions of zero multiplier key 34a to effect escapement of the multiplier carriage so that three of the dials 35 are aligned with the sight opening. However, during setting of a multiplier factor only the number of dials 35 corresponding to the number of digits in the multiplier factor will be seen through sight opening 292.

The operation of setting the multiplier into the machine is accomplished in a well-known manner and it will be recalled that upon depression of each of multiplier keys 34, conventional means are brought into play to release the multiplier rack segment 258 which is operatively related to the keyboard selection mechanism, to set a stop therefor corresponding to the differential value of the depressed multiplier key, and to operate the carriage escapement mechanism, so that the multiplier carriage will move one step to the left, as viewed in Fig.

1, to move the highest order rack segment 258 into alignment with sight opening 292 where its indicator dial 35 will display a figure corresponding to the differentially adjusted position of the rack segment.

Upon release of the aligned holding pawl 284 to its inactive position to release the associated rack segment 258, latch arm 288 (Fig. 9) becomes effective, under the urgency of spring 285, to maintain the associated holding pawl inactive. At the same time that the rack segment 258 is released, depression of the key 34 operates the corresponding selection lever 259 (Figs. 9 and 10) so that the pin 257 of the aligned pin row corresponding to the value of the depressed key is moved to active position to provide a stop for rack segment 258 and thereby control the differential positioning thereof. The pin-setting operation occurs only upon depression of the "1" to "8" keys. If the "9" key is depressed, the only action required is the release of the rack segment which moves to its fullest extent when the upper edge of spoke 293 (Fig. 9) thereof engages transverse bar 294 carried between similar arms 295 of segmental gear 296.

To operate the escapement mechanism, the depression of a multiplier key operates in a conventional manner to rock pawl arm 307 downwardly, whereby stop pawl 304 (Fig. 12) is moved from its active to its inactive position and tooth 312 is moved downwardly into holding position, permitting a partial step movement of the multiplier carriage under the influence of spring-urged bell crank 300 (Fig. 24) to position one of teeth 271 over the upper end of stop pawl 304. This partial step movement occurs simultaneously with the setting of the pin and the release of the rack, and does not effect the cooperative relation of the parts. Subsequently, when the depressed multiplier key is released and moves to its upper position, tooth 312 moves upwardly to inactive position and permits further movement of the multiplier carriage until pawl 304 engages the next adjacent tooth 271 at the completion of the one-step movement of the multiplier carriage.

The above operation occurs each time a multiplier key 34 (Fig. 1) is depressed, so that the entire multiplier factor is set up and the multiplier carriage is moved to the left from its normally inactive position a number of steps corresponding to the number of digits in the multiplier factor. At the end of the multiplier setting operation the last adjusted rack segment 258 is in active relation to the actuating mechanism therefor, i.e., in alignment with feed pawl 318 (Fig. 13).

With the multiplier set in the machine as described, the operator starts the multiplying operation in a positive fashion by selective manipulation of the multiplication keys 36 or 38 and in a negative fashion by selective manipulation of the key 37. With both keys 36 and 37, the first operation is the return of the accumulator carriage to its left-end position, after which the multiplying operation proper is started; whereas with the depression of key 38, an accumulator carriage return operation with resetting of the accumulator, the revolutions counter, or either of them, is determined in a well-known manner in accordance with the setting of the control knobs 28 or 29. The operation will be described in connection with a positive multiplying operation under the control of key 38, and it will be understood that the operation will be similar if key 36 or 37 is depressed.

Depression of key 38 (Fig. 8) operates through arm 406 and therefore bail 407 and arm 410 (Fig. 15) to rock bellcrank 359 clockwise which, through pin 414 rocks arm 415 (Fig. 18) against the urgency of spring 419. Arm 415 serves through link 454 to move the shoulder 460 of arm 457 over the square stud 461 on lever 462 and also imparts a counter-clockwise rocking movement to arm 416 and shaft 156. Such rocking of shaft 156 (clockwise in Fig. 7) serves to position hook 176 relative to pin 183, so that the first machine cycle operates to rock shaft 181 clockwise, thereby moving the pusher links 196 and 209 (to the right as viewed in Figs. 7 and 8) to engage the left shift clutch and the zero resetting clutch. Rocked shaft 156 also serves through arm 199 (Fig. 3) and slide 201 to engage the clutch and close the motor contacts.

If keys 36 or 37 are depressed, bellcrank 424 (Fig. 15) is rocked, and through arm 428, pin 414 (Fig. 18) and arm 415 moves the shoulder 460 over square stud 461 and, through arm 416, rocks shaft 156 in a similar manner to engage the left shift clutch. However, arm 429 of bellcrank 424 imparts a counter-clockwise rotation to arm 431 and therefore shaft 434 to rock arm 435 (Fig. 8), thereby lifting pusher link 209 out of engagement with resetting clutch control push rod 213. Thus with the disabling of the resetting mechanism, the product is accumulated positively or negatively with the value standing in the accumulator dials.

After the initial operation described above with respect to keys 36, 37 and 38, the remaining operations are similar and are dependent upon the oscillation of override pawl 108 (Fig. 4) during the cycle after the last accumulator shift cycle, that is, the resetting cycle, if a resetting operation is determined, which operates through slide 242 (Figs. 3, 6 and 8), bellcrank 243, link 244, and arm 245 to rock shaft 246. Shaft 246 carries arm 248 (Fig. 8) which serves to lift pusher link 209, disabling the resetting drive connection after the resetting operation. Arm 247 (Fig. 6) on shaft 246 operates to lift pusher link 196 and thereby disables the left-hand shift connection after the return and resetting operation or the return operation, as the case may be. Arm 248 also operates through lever 468 (Fig. 8), link 470, and arm 471 to rock shaft 359 and arm 458 (Figs. 15 and 18) to move actuating link 457 downwardly, thereby rocking lever 462 against the urgency of respective springs 464 and 504.

Multiplication control lever 462 is held in its rocked position by the engagement of shoulder 478 of latching bellcrank 475 with the ear 479 under the influence of spring 480 and operates through link 486 and arm 484 on shaft 326 to enable the feed pawl 318 for the racks 258 of the multiplier pin carriage. Control lever 462 also operates through bellcrank 492 to rock shaft 493 and arm 495 counter-clockwise (Fig. 20), which, through spring 539 (Fig. 21) imparts a clockwise rotation to lever 533, thereby effecting subsequent engagement of clutches 500 and 522. After 270 degrees of the overstroke, or resetting, cycle, clutch 500 and cam 374 (Fig. 15) rock lever 370 to move link 368 upwardly, whereupon pin 375 engages ear 377 to move slot 385 into engagement with pin 386 of the gate control lever 387, if key 36 or 38 was depressed. However, upon depression of key 37 for a negative product registration in the accumulator, bellcrank 360 is rocked clockwise in addition to bellcrank 424, and through link 363, arm 364, and link 366, serves to position pin 376 on link 368 beneath ear 391 of setting arm 392, as seen in Fig. 16. Thus the rocking of lever 370 by cam 374 serves to engage slot 394 with pin 395 of gate-setting lever 387. After 30 degrees of the first registering cycle, clutch 522 becomes operative through cam 401 (Figs. 17 and 21) to move plate 380 and the adjusted control arm 378 or 392 to the left, thereby engaging either the plus or minus gears with the accumulator shaft gears after which clutch 522 is rendered inoperative by the engagement of nose 530 with ear 543. However, clutch 500 is rotated another 120 degrees, or after 270 degrees of rotation thereof, nose 498 (Fig. 20) engages the ear 513 to render clutch 500 inoperative.

As explained, the feed pawl 318 returns the aligned rack 258 step-by-step and during the last step of movement of the rack it engages and oscillates lever 533 (counter-clockwise as viewed in Fig. 21 or clockwise as viewed in Fig. 13), whereupon ear 543 is rocked to effect re-engagement of clutch 522. Immediately following the initial rotation of clutch 500 in the first registering cycle, the nose of cam 575 (Figs. 20 and 23) is moved out of engagement with roller 582 on arm 580. However, substantially simultaneously with the release of roller 582 from cam 575, cam 587 (Fig. 21) is rotated by clutch 522 into engagement with roller 586 on arm 584 integral with arm 580 secured on shaft 336, thereby maintaining arms 580 and 584 in their inoperative position. Immediately following rocking of lever 533 (clockwise in Fig. 13), spring 562 serves to rock lever 559 into latching engagement with ear 550 of lever 533 and rocks the arm 569 of bellcrank 566 (counter-clockwise as viewed from the top), so that the nose thereof is in the rotational plane of pin 570 when collar 334 is moved upwardly to its operative position. Following the last step of movement of the active rack 258 or in approximately 270 degrees of the cycle, cam 587 is moved out of engagement with roller 586, whereupon integral arms 580, 584 and shaft 336 are free to rock counter-clockwise under the influence of spring 583. Continued rotation of clutch 522 or after approximately 350 degrees of the cycle, cam 401 serves to return plate 380 to the right, thereby centralizing the plus-minus gears with respect to the accumulator shaft gears. It will be recalled that in the latched position of the control lever 462 (Fig. 15) spring 488 rocks arm 484 and shaft 326 to enable feed pawl 318, thereby moving link 590 (also shown in Fig. 20) forwardly, or to the right, until the left end of the slot therein abuts pin 589 on arm 580. Thus, the rocking of arm 580 serves through link 590, arm 591, and shaft 326 to disable feed pawl 318.

Rocking of shaft 336 (Figs. 5 and 13) operates in a conventional manner through arm 335 to enable the shift for the pin carriage and to move pin 570 into operative relation with the arm 569 of bellcrank 566, and through arm 594 and pin 595 engages the right shift mechanism for the accumulator carriage. In the first 90 degrees of the shift cycle, clutch 522 continues to rotate until it is disengaged by ear 531, as seen in Fig. 21, and cams 401 and 587 are in the position shown. In approximately 230 degrees of the accumulator and pin carriage shift cycle, pin 570 rocks bellcrank 566 to release the latch 559, thereby enabling spring 539 (Fig. 21) to restore lever 533 to its shift sensing position. Clutch 522 is therefore re-engaged and after 300 degrees of the shift cycle, cam 587 restores arms 580 and 584 to their inoperative position, thereby lowering pin carriage shift collar 334 and disabling the accumulator carriage shift mechanism. Restoration of arms 580 and 584 also serves to again enable feed pawl 318 under the influence of spring 488. Upon release of lever 533, cam 401, through clutch 522, is again effective to engage the plus or minus gears with the accumulator shaft gears, and ear 543 of bellcrank 545 serves to disengage clutch 522.

The shifting movement of the multiplier pin carriage moves the adjusted rack 258 of the next higher order into alignment with feed pawl 318 and into operative position relative to lever 533 to determine a subsequent right shift operation.

Thus the machine is conditioned for an ensuing ordinal multiplication, and the above-described cycle of operations is repeated until the number of adjusted racks 258 of the pin carriage are restored to 0 and the pin carriage is at its rightmost position. The last step of movement of the pin carriage operates through bellcrank 300 to delatch the depressed multiplication key and release the latch 475 for the lever 462, whereupon spring 504 becomes effective to restore arm 495 to its clutch-disengaging position. Movement of arm 495 to its normally inactive position operates to rock bellcrank 510 to release ear 513 from its engagement with nose 498 of the pawl of clutch 500, thereby engaging the clutch for its last 90 degrees of rotation, after which it is again disengaged by ear 497, by which time the cam 575 has restored the right shift control arms 580 and 584 to their inoperative position, as seen in Fig. 20.

I claim:

1. In a calculating machine having an accumulator, an actuating means for said accumulator, means for ordinally shifting said accumulator relative to said actuating means, and a multiplying mechanism for controlling the registration of a product in said accumulator by said actuating means, the combination comprising, a sign character control means for determining the sign character of the product registration, normally inactive means for setting said sign character control means, a first clutch for moving said setting means to active position, a second clutch for controlling operation of said setting means in the active position thereof to set said sign character control means, a control key, means rendered effective upon operation of said control key to engage said first clutch, and means operable by said first clutch engaging means to effect engagement of said second clutch.

2. In a calculating machine having an accumulator, an actuating means for said accumulator, means for ordinally shifting said accumulator relative to said actuating means, and a multiplying mechanism for controlling the registration of a product in said accumulator by said actuating means, the combination comprising, a sign character control means for determining the sign character of the product registration, normally inactive means for setting said sign character control means, a first clutch for moving said setting means to active position, a second clutch for controlling operation of said setting means in the active position thereof to set said sign character control means, a control key, means rendered effective upon operation of said control key to engage said first clutch, means operable by said first clutch-engaging means to effect engagement of said second clutch, and latch means operable to maintain said first clutch-engaging means in clutch-engaging position.

3. In a calculating machine having an accumulator, actuating means therefor, means for connecting said actuating means with said accumulator to effect a registration therein, means for shifting said accumulator relative to said actuating means, means for controlling the operation of said shifting means, and a plural order operational control mechanism including a normally disengaged clutch operable in the disengaged position thereof to disable said shift controlling means, control means for effecting engagement of said clutch, a second clutch operable to control said connecting means and said shift controlling means, clutch control means operable by said clutch-engaging means to effect engagement of said second clutch to disable said shift controlling means and to enable said connecting means upon operation thereby, auxiliary means rendered operable by said clutch control means upon operation by said clutch-engaging means to effect disengagement of said second clutch intermediate its full-cycle position subsequent to the disabling of said shift controlling means and the enabling of said connecting means thereby, and means ordinally operable by said plural order control mechanism to control the alternate operation of said clutch control means and said auxiliary means subsequent to the operation by said clutch-engaging means.

4. In a device having a power transmission mechanism including a first clutch and a second clutch, normally inactive means positionable to initiate operation of said first clutch, control means for moving said initiating means to active position, means controlled by said initiating means for disengaging said first clutch following a partial cyclic rotation thereof, auxiliary means normally positioned to cause disengagement of said second clutch, resilient means enabled by said initiating means upon operation by said control means to move said auxiliary means to clutch-engaging position, secondary disengaging means operated by said auxiliary means upon operation thereof to disengage said second clutch following a partial cyclic rotation thereof, latch means for maintaining said initiating means in its active position, and means enabled by said control means to move said auxiliary means to its clutch-disengaging position, thereby releasing said secondary disengaging means for effecting rotation of said second clutch to its full-cycle position.

5. In a machine having a power transmission mechanism for performing a plurality of cyclic machine operation, said mechanism including a first clutch and a second clutch, means controlled jointly by said first clutch and said second clutch for intermittent control of one machine operation, means operable by said first clutch in the full-cycle position thereof for disabling said controlled means, means for engaging said first clutch to render said disabling means ineffective, means associated with said engaging means and operable thereby to disengage said first clutch following a partial cyclic rotation thereof, latch means for latching said engaging means in clutch-engaging position, a clutch control means normally maintaining said second clutch in a full-cycle disengaged position but simultaneously operable by said engaging means to effect engagement of said second clutch, means controlled by said second clutch and immediately operable upon operation of said clutch-engaging means and said clutch control means to disable said jointly controlled means, normally inactive means rendered operable upon partial cyclic rotation of said second clutch to condition the machine for a second operation, partial cyclic control means operable by said clutch control means to disengage said second clutch in a predetermined angularly rotated position thereof, and an operation control means operable to restore said clutch control means to its normal position and to release said partial cyclic control means in the latched position of said engaging means for effecting operation of said second clutch to restore said normally inactive means and said second clutch controlled means to their initial position thereby enabling said controlled means to initiate the first-mentioned machine operation.

6. In a device having a power transmission mechanism including a first clutch and a second clutch, means positionable to initiate operation of said first clutch, means controlled by said initiating means for disengaging said first clutch following a partial cyclic rotation thereof, means operable to effect engagement of said second clutch, resilient means enabled by said initiating means upon operation thereof to control the operation of said engaging means, means associated with said clutch-engaging means and jointly operable to control the engagement and disengagement of said second clutch for partial cyclic rotations thereof upon initiation of operation of said first clutch, and latch means for maintaining said initiating means in an operative position.

7. In a device having a power transmission mechanism including a first clutch and a second clutch, means for initiating operation of said first clutch, means controlled by said initiating means for disengaging said first clutch following a partial cyclic rotation thereof, means operable to effect engagement of said second clutch, resilient means enabled by said initiating means upon operation thereof to render operable said engaging means, and means associated with said clutch-engaging means and jointly operable to control the engagement and disengagement of said second clutch for partial cyclic rotation thereof upon initiation of operation of said first clutch.

8. In a calculating machine having an accumulator, actuating means therefor, means for ordinally shifting said accumulator in either direction relative to said actuating means, means adjustable from an inoperative to an operative position to control the sign character of registrations in said accumulator, and a multiplying mechanism for controlling a product registration in said accumulator including a clutch, full-cycle control means positionable to engage said clutch, a control key, means operable by said control key to effect operation of said shifting means for moving said accumulator in one direction to an end position, means operable by said shifting means in the end position of said accumulator for initiating operation of said multiplying mechanism and actively positioning said positionable full-cycle control means, means settable by said clutch upon engagement thereof to condition said adjustable means for movement to an operative position, a second clutch, means associated with said settable means and operable by said second clutch upon engagement thereof to move said adjustable means to an operative position, and clutch control means operable by said positionable means to effect engagement of said second clutch.

9. In a calculating machine the combination of an accumulator for receiving a product, means for ordinally shifting said accumulator in either direction, means adjustable from an inoperative to an operative position for the transmission of values into said accumulator in each ordinal position thereof, sign character control means including normally inactive positive and negative setting means for control of said adjustable means, means normally operatively positioned relative to said positive setting means and positionable relative to said negative setting means, a positive and negative control key, means effective upon depression of said negative control key to operatively position said positionable means relative to said negative setting means, a first clutch having a full-cycle position thereof, a first clutch control means normally operative to maintain said first clutch in the full-cycle position thereof and movable to effect engagement of said first clutch, an arm positionable by said first clutch control means to effect disengagement or engagement of said first clutch, a cam means operable by said first clutch upon engagement thereof for actuating said positionable means to move said inactive positive or negative setting means into active position relative to said adjustable means in accordance with the key depressed, a multiplier mechanism for receiving a plural digit multiplier factor including a shiftable carriage and means for ordinally shifting said carriage to its home position, power means operable to effect operation of said accumulator shifting means to shift said accumulator in one direction to an end position, means responsive upon depression of either control key to enable said power means, means controlled by said accumulator shifting means in the end position of said accumulator to move said first clutch control means to clutch-engaging position, to position said arm for disengagement of said first clutch in a predetermined angularly rotated position thereof, and to enable said actuating means, a latch operable to maintain said first clutch control means in clutch-engaging position, a second clutch, means associated with said sign character control means and operable by said second clutch in a partial cyclically rotated position thereof to control the operation of the said actively positioned setting means to move said adjustable means to an operative position, a lever normally operative to maintain said second clutch in a full-cycle position thereof, intermittent control means operable by said lever to effect disengagement or engagement of said second clutch in a partial cyclically rotated position, resilient means enabled by said first clutch control means upon movement to operative position to render said lever operable to effect engagement of said second clutch and to enable the operation of said intermittent control means to disengage said second clutch in a partial cyclic position thereof, shift control means for enabling operation of said accumulator shifting means to shift said accumulator in the other direction and to effect operation of said carriage shifting means, means operable by said first clutch in the full-cycle position thereof to disable said shift control means, a clutch driven cam immediately operable upon engagement of said second clutch to disable said shift control means, means ordinally operable by said multiplier mechanism in each ordinal position of said carriage to restore said lever to the full-cycle clutch-disengaging position thereby effecting operation of said intermittent control means to enable engagement of said second clutch, the engagement of said second clutch effected by said intermittent control means operating to render said associated means effective to move said sign character control means to an inoperative position and to render said clutch driven cam operable to enable said shift control means, a latching means for cooperation with said lever normally maintained inoperative by said first clutch control means in the normally operative position thereof, means for moving said latching means into active engagement with said lever upon operation thereof by said multiplier mechanism, latch releasing means operable by said carriage shifting means to enable operation of said resilient means, means operable by said carriage in the home position thereof for controlling said lever to maintain said second clutch in its full-cycle disengaged position and to release said latch, and means operable upon release of said latch to position said first clutch control means in its normally operative position for disengaging said first clutch in the full-cycle position thereof and effecting operation of said arm to enable engagement of said first clutch thereby rendering said disabling means operative to disable said shift control means.

10. In a calculating machine having an accumulator for receiving a product, means for ordinally shifting said accumulator in either direction, sign character control means adjustable from an inoperative to an operative positon to transmit values into said accumulator, power means for effecting operation of said shifting means to move said accumulator in one direction to an end position, and a multiplier control mechanism including a shiftable carriage and means for shifting said carriage, a control key operable upon depression to initiate operation of said power means, shift control means for enabling said shifting means to move said accumulator in the other direction and for enabling operation of said carriage shifting means, means normally positioned to disable said shift control means, a two-position clutch operable in the first position to maintain said sign character control means inoperative and to enable said shift control means upon release of said disabling means, means for enabling rotation of said clutch to a second position, means operable by said rotation enabling means for disengaging said clutch in the second position thereof, means controlled by said clutch upon rotation to the second position to disable said shift control means, clutch driven means operable in the second position thereof to adjust said sign character control means to an operative position, a positionable member operable to render said normally positioned means ineffective to disable said shift control means, means actuated by said shifting means in the end position of said accumulator to position said positionable member and to initiate operation of said multiplier control mechanism, resilient means operable by said positionable member upon positioning thereof to effect operation of said clutch enabling means and said disengaging means, and means controlled by said multiplier control mechanism for rendering said clutch-enabling means operable to disengage said clutch in the first position thereof and to render said disengaging means operable to engage said clutch for movement to the first position, said last movement of said clutch being operable to cause said clutch driven means to adjust said sign character control means to its inoperative position and to render said clutch controlled means operable to effect operation of said shift control means.

11. In the calculating machine of claim 10 having a first latch for maintaining said actuated means in its operative position, a latching member rendered operable by said positionable member for latching said clutch-enabling means upon the operation thereof to disengage said clutch in the first position, release means operable by said carriage shifting means to release said latching member and to enable said resilient means, means operable by said shiftable carriage in a predetermined shifted position thereof to release said latch, and means operable upon release of said latch to restore said positionable member to its initial position thereby effecting operation of said normally positioned means to disable said shift control means.

12. In a calculating machine having an accumulator, actuating means therefor, means for ordinally shifting said accumulator in either direction relative to said actuating means, a plurality of control keys, power means operable to effect operation of said shifting means for moving said accumulator in one direction to an end position, means rendered effective by said power means to zeroize said accumulator in the said end position thereof upon operation of one of said keys, means operable by said one of said keys to initiate operation of said power means, means adjustable from an inoperative to an operative position to control the sign character of registrations in said accumulator, and a multiplying mechanism for controlling product registrations in said accumulator including a first and second clutch, means settable by said first clutch upon engagement thereof to condition said adjustable means for movement to an operative position, means operated by said second clutch upon engagement thereof to control the adjustment of said adjustable means, control means positionable to engage said first clutch and said second clutch, means connected to said initiating means and movable therewith upon manipulation of said one of said keys, means associated with said connected means for operative control thereof, means conditioned by said associated means for control by said shifting means in the said end position of said accumulator to initiate operation of said multiplying mechanism and to actively position said positionable means, means responsive to the manipulation of the other of said keys to actuate said associated means for the control of the operation of said initiating means, a blocking member mounted for movement with said connected means, and a roller mounted on said associated means and operable upon manipulation of said one of said keys to cam said blocking member into blocking relation with said responsive means to prevent a depression of said other of said keys.

13. In a calculating machine having an accumulator, actuating means therefor, means for controlling the sign character of registrations in said accumulator, a positive and a negative setting means normally inoperative to set said sign character controlling means, means selectively operable to move either of said setting means to operative position, power means for controlling operation of said moving means, a power-driven means for actuating the operatively positioned one of said setting means, a positive and a negative control key, and means rendered effective upon operation of either of said keys to determine the operation of said moving means and to enable the operation of said power means and said power-driven means.

14. In a calculating machine having an accumulator, actuating means therefor, an operational control mechanism for controlling the operation of said actuating means, means for controlling the sign character of registrations in said accumulator, a positive and a negative setting means normally inoperative to set said sign character controlling means, means selectively operable to move either of said setting means to operative position, power means for controlling operation of said moving means, a power-driven means for actuating the operatively positioned one of said setting means, a positive and a negative control key, means rendered effective upon operation of either of said keys to determine the operation of said moving means, to enable the operation of said power means and said power-driven means, and to initiate operation of said operational control mechanism, a latch means for said last-mentioned means, and means controlled by said operational control mechanism for releasing said latch means thereby terminating the operation.

15. In a calculating machine having an accumulator, an actuating means therefor, means for shifting said accumulator relative to said actuating means, a sign character control means for said accumulator, and a multiplication control mechanism including a control key, normally inactive means for setting said sign character control means, a first clutch and a two-phase clutch, a clutch-engaging means for said first clutch, a primary clutch control member for said second clutch, resilient means for moving said primary clutch member from a clutch-disengaging position to a clutch-engaging position to effect engagement of said second clutch for its first phase of rotation thereof, means rendered effective upon operation of said key to cause engagement of said first clutch and to position said primary member in its clutch-engaging position, means operable by said first clutch upon engagement thereof to operatively position said setting means relative to said sign character control means, a latch means for maintaining said clutch-engaging means in an operative position, means operable by said second clutch upon engagement thereof to actuate said setting means in the first phase of the cycle and to restore said setting means in the second phase of the cycle, an auxiliary control means operable by said resilient means to disengage said second clutch following a predetermined angular rotation thereof and effective upon movement of said primary member to clutch-disengaging position to effect re-engagement of said second clutch for its second phase of rotation thereof, means positionable by said second clutch during the second phase thereof and upon operation of said first clutch to effect operation of said shifting means, and means controlled by said multiplication control mechanism to control the positioning of said primary member subsequent to the operation of said clutch-engaging means.

16. In a calculating machine, the combination of an accumulator, settable means for controlling the sign character of registrations in said accumulator, normally inactive means for setting said sign character controlling means, positive and negative control keys, means controlled by either of said keys to condition said setting means for setting in accordance with the sign character of the key operated, a first clutch, means operated by said first clutch for setting said setting means, a second clutch, means operated by said second clutch to substantially simultaneously actuate said set setting means to operate said settable means, and means effective upon operation of either of said keys to engage said first clutch and said second clutch.

17. In a calculating machine having an accumulator, an actuating means therefor, clutch-operated means for driving said actuating means, sign character control means for said accumulator, shifting means for shifting said accumulator relative to said actuating means, and a power-operated control mechanism driven by said clutch-operated means for controlling said sign character control means and said shifting means, said mechanism including a first clutch and a two-phase clutch, means controlled jointly by said first clutch and said two-phase clutch for effecting operation of said shifting means, means normally operatively positioned by said first clutch for disabling said jointly controlled means and operable upon engagement and operation of said first clutch to enable said last named means and to condition said sign character control mechanism for operation, means for engaging said first clutch, auxiliary engaging means operable by said engaging means to effect engagement of said two-phase clutch for the first phase of clutch operation, means associated with said two-phase clutch and operable thereby to operate said sign character control means and disable said jointly controlled means in the first phase of clutch operation and to disable said sign character control means and enable said jointly controlled means in the second phase of clutch operation, clutch-operating means rendered effective by said auxiliary engaging means to enable the engagement and disengagement of said two-phase clutch for each phase of operation, manually operable means for effecting operation of said engaging means and initiating operation of said clutch-operated means, and operational control means driven by said clutch-operated means and operable upon operation of said manually operable means to control the operation of said clutch-operating means.

18. In a calculating machine having an accumulator, actuating means therefor, means for connecting said actuating means with said accumulator to effect a registration therein, means for shifting said accumulator relative to said actuating means, means for controlling the operation of said shifting means, and a plural order operational control mechanism including a normally disengaged two-phase clutch operable in the initial position thereof to disable said shift controlling means, a first clutch control means for effecting engagement of said clutch, means for disengaging said clutch in its intermediate position, a second two-phase clutch operable to control said connecting means and said shift controlling means, a second clutch control means operable by said first clutch-engaging means to effect engagement of said second clutch to disable said shift controlling means and to enable said connecting means upon operation thereof, auxiliary means rendered operable by said second clutch control means upon operation of said first clutch-engaging means to effect disengagement of said second clutch intermediate its full-cycle position subsequent to the disabling of said shift controlling means and the enabling of said connecting means thereby, and means ordinally operable by said plural order control mechanism to control the alternate operation of said second clutch control means and said auxiliary means subsequent to the operation by said first clutch-engaging means, and means for disabling said disengaging means and thereby enabling the return of the first clutch to its initial position.

19. In a calculating machine having an accumulator, actuating means therefor, means for shifting said accumulator relative to said actuating means, means for controlling the sign character of registrations in said accumulator, and normally inactively positioned means for setting said sign character controlling means, the combination comprising means normally operatively positioned to disable said shifting means, a first clutch operable upon engagement and operation thereof to actively position said setting means relative to said sign character controlling means and to move said disabling means to an inoperative position, a power driven means for actuating said setting means in the active position thereof to set said sign character controlling means, a cyclic clutch operable upon engagement and operation thereof to control said power driven means and to restore said disabling means to its operative position, means for engaging said first clutch, means for latching said engaging means in its operative position, cyclic clutch-operating means for engaging and disengaging said cyclic clutch in the full-cycle position thereof and thereby control operation and restoration of said setting means, resilient means for biasing said cyclic clutch operating means to its clutch-engaging position upon operation of said first clutch-engaging means, disengaging means conditioned for operation by said engaging means and operative to disengage said cyclic clutch following a partial cyclic rotation thereof, and operational control means operable to control alternate operation of said disengaging means and said clutch-operating means to effect engagement and disengagement of said cyclic clutch.

(References on following page)

References Cited in the file of this patent

UNITED STATES PATENTS

| | | |
|---|---|---|
| 1,637,827 | Kottmann | Aug. 2, 1927 |
| 2,117,620 | Mathi | May 17, 1938 |
| 2,148,760 | Lerch | Feb. 28, 1939 |
| 2,149,817 | Niemann | Mar. 7, 1939 |
| 2,215,263 | Eichler | Sept. 17, 1940 |
| 2,333,234 | Boyden | Nov. 2, 1943 |
| 2,367,386 | Crosman | Jan. 16, 1945 |
| 2,371,752 | Friden | Mar. 20, 1945 |
| 2,399,917 | Friden | May 7, 1946 |
| 2,400,244 | Mathi | May 14, 1946 |
| 2,467,441 | Noller | Apr. 19, 1949 |
| 2,485,695 | Carlstrom | Nov. 25, 1949 |
| 2,539,948 | Ellerbeck | Jan. 30, 1951 |
| 2,609,145 | Boyden | Sept. 2, 1952 |
| 2,636,677 | Gang | Apr. 28, 1953 |
| 2,650,761 | Machado | Sept. 1, 1953 |

UNITED STATES PATENT OFFICE
CERTIFICATE OF CORRECTION

Patent No. 2,935,254                                                          May 3, 1960

Gilman Plunkett

It is hereby certified that error appears in the printed specification of the above numbered patent requiring correction and that the said Letters Patent should read as corrected below.

Column 1, line 42, for "controled" read -- controlled --; line 45, for "substractive" read -- subtractive --; line 72, for "therefore" read -- therefor --; column 2, line 29, after section" insert a comma; line 64, for "thereof" read -- therefor --; column 3, line 34, after "set" strike out the hyphen; column 4, line 1, for "mechanism" read -- mechanisms --; column 7, line 54, after "180" insert a comma; column 12, line 39, for "291" read -- 297 --; column 13, line 16, for "stages", second occurrence, read -- stage --; column 15, line 3, for "according" read -- accordance --; line 52, after "of" insert -- a --; line 66, for "inserted" read -- inverted --; column 16, line 40, strike out "a", column 23, line 2, for "alinged" read -- aligned --; line 5, for "postively" read -- positively --; column 24, line 26, strike out "relative"; line 64, after "582" insert a comma; column 29, line 22, for "machanism" read -- mechanism --; column 30, line 27, for "fo" read -- of --; column 33, line 41, for "633" read -- 663 --; column 34, line 36, for "my" read -- by --; column 36, line 33, for "359" read -- 459 --; column 37, line 25, for "(Fig. 15)" read -- (Fig. 15), --.

Signed and sealed this 18th day of April 1961.

(SEAL)
Attest:

ERNEST W. SWIDER                                                DAVID L. LADD

Attesting Officer                                             Commissioner of Patents